United States Patent [19]

Kando et al.

[11] Patent Number: 5,404,009
[45] Date of Patent: Apr. 4, 1995

[54] INTEGRATED OPTICAL INFORMATION DETECTOR FOR AN OPTICAL INFORMATION PROCESSING APPARATUS WITH A PLURALITY OF PHOTO DETECTING STRIPS AND A COMMON BONDING PAD

[75] Inventors: Hidehiko Kando, Matsudo; Mamoru Kainuma, Ibaraki; Masaru Muranishi, Ibaraki; Katsuhiko Kimura, Ibaraki, all of Japan

[73] Assignee: Hitachi, Ltd., Tokyo, Japan

[21] Appl. No.: 69,511

[22] Filed: Jun. 1, 1993

[30] Foreign Application Priority Data

Jun. 2, 1992 [JP] Japan ................... 4-141311

[51] Int. Cl.6 ........................................ H01J 5/16
[52] U.S. Cl. ....................... 250/227.24; 250/568; 360/114; 369/112; 385/14
[58] Field of Search .............. 250/227.24, 560, 565, 250/563, 568; 360/114, 59; 369/112, 110, 44.12, 13; 385/14, 9, 10

[56] References Cited

U.S. PATENT DOCUMENTS 4,971,414 11/1990 Funato et al. .
5,091,982 2/1992 Yokomori et al. .
5,091,983 2/1992 Lukosz ................ 250/231.19
5,153,860 10/1992 Sunagawa et al. ........... 360/114

FOREIGN PATENT DOCUMENTS 0357780 3/1990 European Pat. Off. .
0452793A2 10/1991 European Pat. Off. .

Primary Examiner—David C. Nelms
Assistant Examiner—Que T. Le
Attorney, Agent, or Firm—Antonelli, Terry, Stout & Kraus

[57] ABSTRACT

An information processing apparatus such as an optical disc device which is provided with an integrated photo detector for transducing a reflected light beam from an optical information medium to an electric signal. The integrated photo detector used in the apparatus comprises a substrate; an optical guide formed on the substrate; and a plurality of integrated photo detecting sections each including a grating coupler for guiding the reflected light beam to the optical guide, and a photo detecting unit for detecting a guided light beam in the optical guide. The use of this integrated photo detector results in increasing error tolerance relative to incident angle and incident position to improve the incidence efficiency, thereby elevating the reliability of the apparatus.

7 Claims, 14 Drawing Sheets

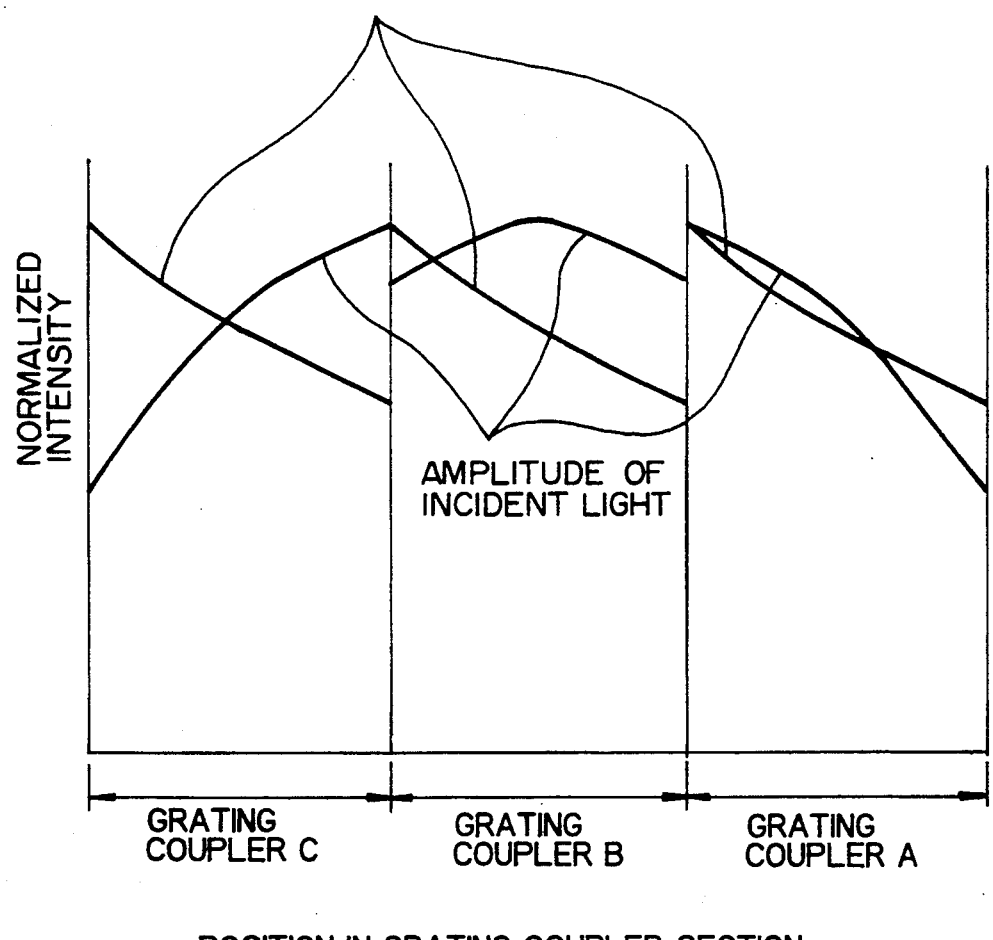

INTEGRATED OPTICAL INFORMATION DETECTOR FOR AN OPTICAL INFORMATION PROCESSING APPARATUS WITH A PLURALITY OF PHOTO DETECTING STRIPS AND A COMMON BONDING PAD

BACKGROUND OF THE INVENTION

The present invention relates to an optical information processing apparatus, for example, an optical disc device or the like, and more particularly to an optical information processing apparatus using a guide element.

An optical information processing apparatus using a guide element is described in JP-A-2-7238. In this type of optical information processing apparatus, an incident light coupling section in the guide element is split in a direction parallel to the optical axis of guided light.

When the size of a portion effective to excite guided light in the incident light coupling section is large, the tolerance of an incident angle of light which provides a suitable incidence efficiency becomes small, thereby presenting a problem that the mounting thereof cannot be easily adjusted.

On the other hand, when the size of the portion effective to excite guided light in the incident light coupling portion is small, a problem is also encountered that light incident on the incident light coupling section is not easily positioned.

Further, if the incident light coupling section is not split in a direction which intersects the optical axis of guided light, a sufficiently high incidence efficiency cannot be achieved.

As described above, it is quite difficult to improve the reliability of optics using such an incident light coupling section, from the fact that the mounting adjustment is not so easy and that the incidence efficiency is not sufficiently high, thereby presenting a problem that the reliability as the whole optical information processing apparatus cannot either be improved sufficiently.

SUMMARY OF THE INVENTION

It is an object of the present invention to provide an optical information processing apparatus which is capable of improving the reliability as the whole apparatus.

To achieve the above object, the present invention provides an optical information processing apparatus having an integrated photo detector for transducing a reflected light beam from an optical information medium to an electric signal, wherein the integrated photo detector comprises a substrate; an optical guide formed on this substrate; and a plurality of integrated photo detecting sections each including a grating coupler for guiding the reflected light beam into the optical guide and a photo detecting unit for detecting a guided light beam in the optical guide.

By forming the integrated photo detector by the substrate; the optical guide formed on this substrate; and the plurality of integrated photo detecting sections each including a grating coupler for guiding the reflected light beam into the optical guide and a photo detecting unit for detecting a guided light beam in the optical guide, the size of an incident light coupling section can be reduced with respect to the optical axis direction of the guided light beam. Consequently, not only larger tolerance is available to an incident angle and an incident position, but also tolerance for wavelength fluctuations and manufacturing errors during the manufacturing of the optical guide can be made larger, with the result that the reliability can be improved as the whole optical information processing apparatus.

BRIEF DESCRIPTION OF THE DRAWINGS

FIG. 7 is a graph showing the characteristics of the photo detector of the present invention, used for explaining the light utilizing efficiency thereof;

DESCRIPTION OF THE PREFERRED EMBODIMENTS

One embodiment of the present invention will hereinafter be described with reference to FIG. 1. Note that FIG. 1 shows an optical disc device, which will be explained as an example of an optical information processing apparatus.

Figure 1:
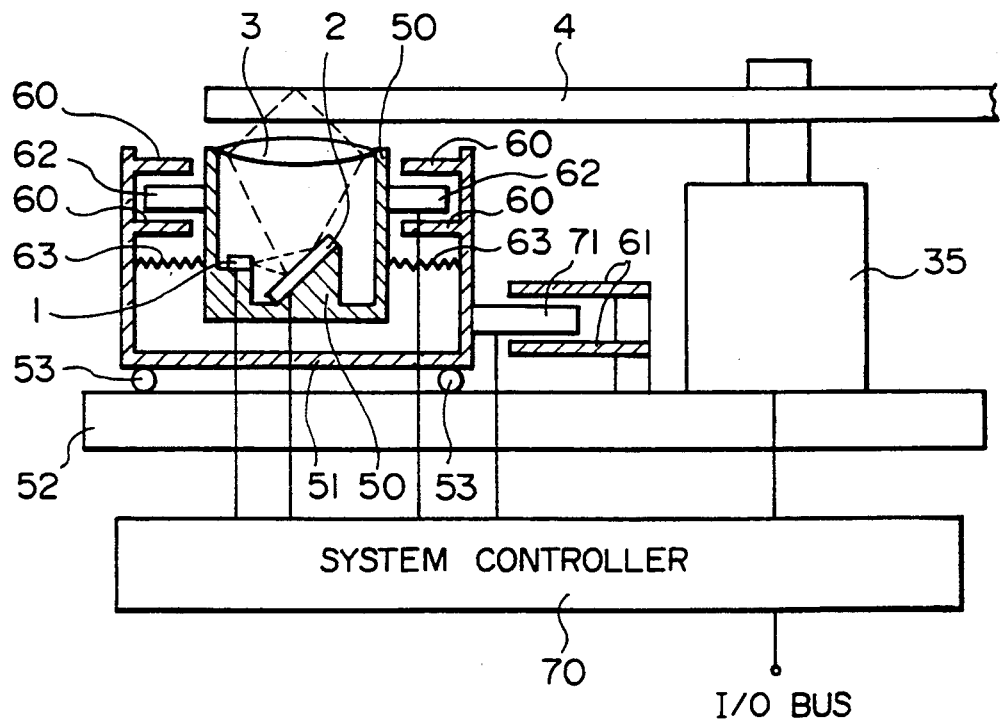
FIG. 1 is a front elevation showing, partially in section, one embodiment of the present invention.

In FIG. 1, a light beam emitted from a semiconductor laser 1, fixed to a housing 50 and driven by a system controller 70, illuminates an integrated photo detector 2. The reflected light beam therefrom passes through an objective lens 3 fixed to the housing 50 and illuminates an optical disc 4. A signal light beam 101 reflected by the optical disc 4 again passes through the objective lens 3 and illuminates the integrated photo detector 2.

Figure 2:
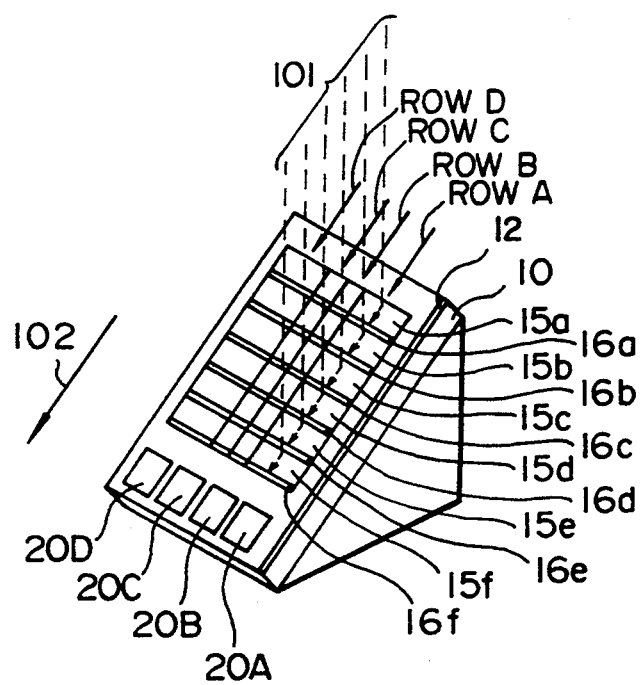
FIG. 2 is a perspective view showing an example of a photo detector in the apparatus shown in FIG. 1.

The integrated photo detector 2 comprises a semiconductor substrate 10, a conductive thin film 12 and an incidence coupling section as shown in FIG. 2. Here, the incidence coupling section is assumed to be a grating coupler, by way of example. Within the conductive thin film 12, at least portions in which grating couplers 15a–15f and photo detecting sections 16a–16f are formed are constructed to function as photo guides, the details of which will be described later.

The grating couplers are split in parallel with the optical axis direction 102 of a guided light beam. Here, they are referred to as a grating coupler row A; a grating coupler row B; a grating coupler row C; and a grating coupler row D, respectively. The grating couplers in each row are further split in a direction intersecting with the optical axis direction 102 of the guided light beam, for example, in the direction perpendicular to the optical axis direction 102 of the guided light beam. Here, the grating coupler row A only will be explained. The grating coupler row A comprises grating couplers 15a–15f and photo detecting sections 16a–16f corresponding to the grating couplers 15a–15f, respectively. Guided light beams excited by the grating couplers 15a–15f are directed to the corresponding photo detecting sections 16a–16f which detect the intensities of the respective guide light beams. The grating couplers in the rows B, C and D are likewise split in a direction intersecting the optical axis direction 102 of the guided light beam, for example, in the direction perpendicular to the optical axis direction 102 of the guided light beam.

The photo detecting sections in the grating coupler row A are electrically connected such that a signal indicative of the sum of the detected intensities of the guide light beams is outputted to a bonding pad 20A. Likewise, the sum of outputs of photo detecting sections in the grating coupler row B is outputted to a bonding pad 20B; the sum of the outputs of the photo detecting sections in the row C is outputted to bonding pad 20C; and the sum of the outputs of the photo detecting sections in the row D is outputted to a bonding pad 20D, respectively. Outputs of the bonding pads 20A–20D are supplied to the system controller 70 which generates a focus error signal, a track error signal and a read signal for the optical disc by the following processing:

(Focus Error Signal)=(Sum of Row A)−(Sum of Row B)−(Sum of Row C)+(Sum of Row D)

(Track Error Signal)=(Sum of Row A)+(Sum of Row B)−(Sum of row C)−(Sum of Row D)

(Read Signal)=(Sum of Row A)+(Sum of Row B)+(Sum of Row C)+(Sum of Row D)

Turning back to FIG. 1, the housing 50 is supported by a suspension 63 in a manner that the housing 50 is movable in the direction perpendicular to a recording surface of the optical disc 4 and in the radial direction of the optical disc 4.

In response to the focus error signal detected as described above, the system controller 70 applies a current to an electromagnetic coil 62 arranged in a magnetic circuit 60 to move the housing 50 in the direction perpendicular to the surface of the optical disc 4 for focus control.

In response to the detected track error signal and an information access request from an external apparatus through an I/O bus, the system controller 70 applies a current to a rough movement electromagnetic coil 71 arranged in a magnetic circuit 61 to move an outer housing 51 mounted on a straight rail mechanism 53 in the radial direction of the optical disc 4. Further, the system controller 70 applies a current to an electromagnetic coil 62 arranged in the magnetic circuit 60 to move the housing 50 in the radial direction of the optical disc 4. By thus moving the outer housing 51 and the housing 50, a tracking control is performed for the optical disc 4.

The system controller 70 rotates the optical disc 4 by a rotary motor 35.

The system controller 70 also transfers a read signal thus derived to external apparatus through the I/O bus.

To perform the foregoing operations, the system controller 70 is supplied with electric energy from an external power supply, not shown in the drawing.

Figure 3:
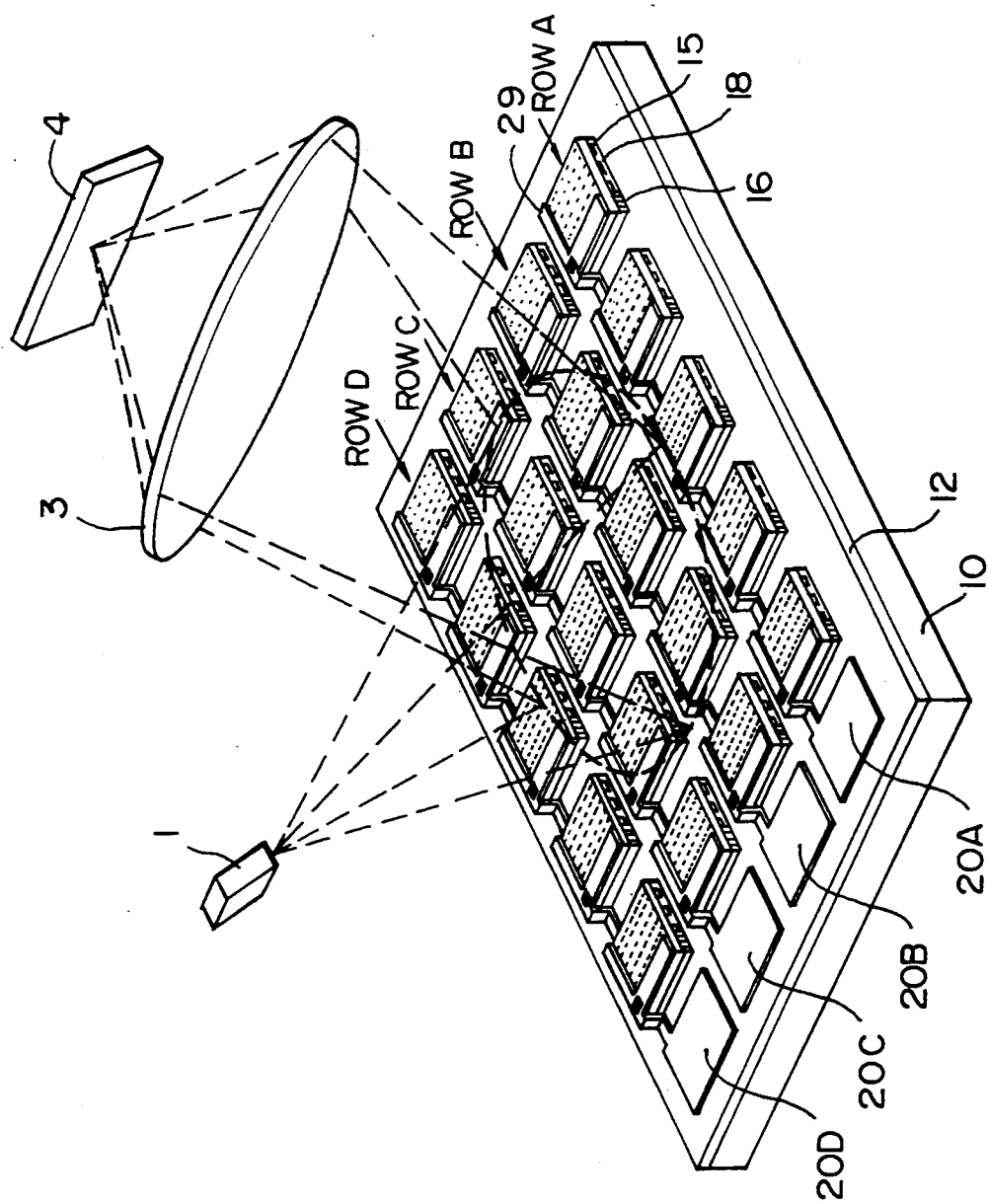
FIG. 3 is an enlarged perspective view showing an example of a photo detector in the apparatus shown in FIG. 1.

Next, the structure of the integrated photo detector 2 will be described in detail with reference to FIG. 3. FIG. 3 illustrates the integrated photo detector 2, the objective lens 3 and the semiconductor laser 1 shown in FIG. 1. Part of the light beams emitted from the semiconductor laser 1 is reflected by the semiconductor substrate 10, passes through the objective lens 3, and is converged onto the optical disc 4. The light beam reflected by the optical disc 4 again passes through the objective lens 3 and illuminates the semiconductor substrate 10.

Explaining the structure of the integrated photo detector 2, a buffer layer 12 made of a conductive material is formed on the semiconductor substrate 10. Formed on the buffer layer 12 are a plurality of optical guides 18, grating couplers 15 and the photo detecting sections 16 which are all split along the optical axis direction of the guided light beam and in the direction perpendicular to the optical axis of the guided light beam as shown in FIG. 1. The light detectors in the respective rows A–D are connected to the bonding pads 20A–20D, respectively, by electric connections through wires 29 which are formed by thin films provided on the semiconductor substrate 10. Signals from the respective photo detectors are taken out through the bonding pads 20A–20D to the outside.

Figure 4:
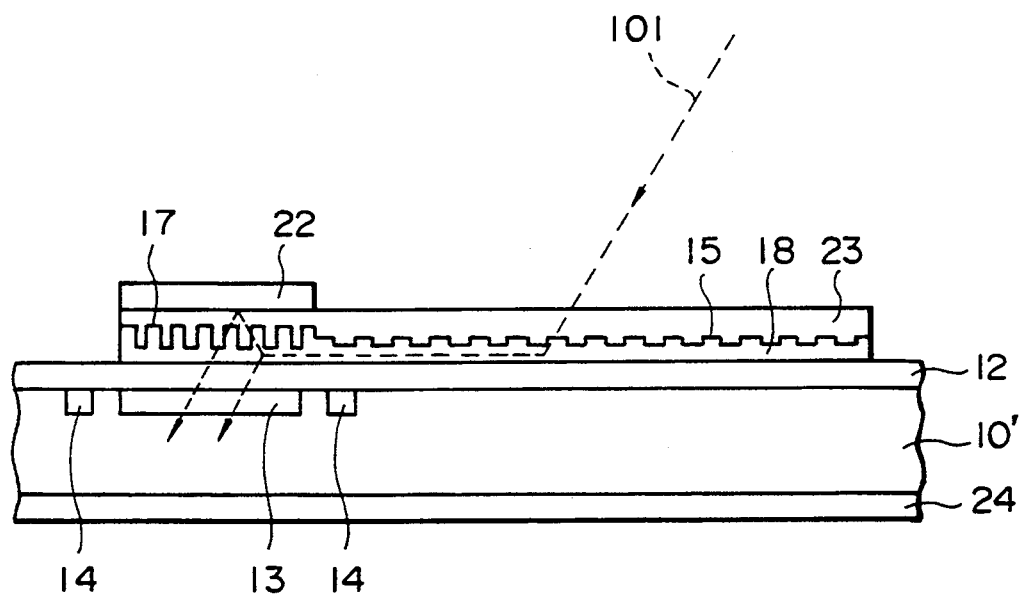
FIG. 4 is a cross-sectional view of the photo detector shown in FIG. 3.

Next, the integrated photo detector 2 will be described in greater detail with reference to FIG. 4. FIG. 4 illustrates in cross-section minimum units of the optical guides 18, grating couplers 15 and photo detecting sections 16 which are split in a plural number. It should be noted that the cross-section is taken along a direction substantially parallel to the optical axis of the guided light beam. While it can be thought that the semiconductor substrate 10 may be made of a variety of materials such as silicon, germanium, gallium arsenide and so on, the semiconductor substrate 10 is explained here as being made of silicon.

In FIG. 4, formed on a silicon substrate 10' made of silicon mixed with N-type impurities in a low concentration are a rear electrode 24 highly doped with N-type impurities, a P-layer 13 highly doped with P-type impurities, and a channel stopper 14 highly doped with N-type impurities in a region surrounding the P-layer 13, thus forming a PIN-type photo detector. When a reverse bias is applied between the rear electrode 24 and the P-layer 13 by the system controller 70 in FIG. 1, a light beam incident on the PIN structure can be taken out as a current. The channel stopper 14 serves to prevent an unnecessary surface current or the like from flowing through the PIN structure so as to maintain a high signal quality.

The silicon substrate 10' is formed with a buffer layer 12 for preventing guided light beams propagating the optical guides 18 from being excessively absorbed by the silicon substrate 10' of FIG. 4, at a location outside of the photo detecting sections of FIG. 3. The buffer layer 12 is also provided with an optical guide 18 which in turn is formed with a grating coupler 15. The optical guide 18 is also formed with a clad layer 23 for protecting the optical guide 18 from dust particles and so on which may attach thereon from the outside.

The signal light beam 101 in FIG. 1 is converted by diffraction of the grating coupler 15 to a guided light beam which propagates the optical guide 18. This guided light beam is diffracted by the action of a radiate diffraction grating 17. A light beam diffracted toward the silicon substrate 10' is incident on the PIN-type photo detector described above. Also, a light beam diffracted in the direction opposite to the silicon substrate 10', in the light beam diffracted by the radial diffraction grating 17, is reflected by the action of a reflective layer 22 and also incident on the PIN-type photo detector. The guided light beam is transduced to an electric signal and detected in the PIN-type photo detector.

The reflective layer 22, the clad layer 23, the optical guide 18, the radial diffraction grating 17, the buffer layer 12, the P-layer 13, the silicon substrate 10' and the rear electrode 24 serve as a whole as a mechanism for detecting the intensity of the guide light beam propagating the photo guide 18, which corresponds to the photo detecting section 16 previously explained in connection with FIGS. 1–3.

The photo detecting section 16 shown in FIGS. 2 and 3 is preferably constructed rather using the radial diffraction grating 17 herein shown. This is because of the following reasons: (1) its size can be made relatively small; (2) the reflective layer 22 prevents light directly emitted from the semiconductor laser 1 of FIG. 1 (light which illuminates the semiconductor substrate 10 before reaching the optical disc 4 in FIG. 3) from entering the PIN structure of FIG. 4 to generate unnecessary signals, thereby providing a high quality of detected signals; (3) If a conductive material is selected for the reflective layer 22, the reflective layer 22 can be formed simultaneously with the wires 29 made of thin film in FIG. 2, whereby the manufacturing process can be simplified; and so on. While the embodiments will be subsequently described using the photo detecting section in this structure, an alternative photo detector using a different guide structure, generally known to those skilled in the art, may be used instead of the above-mentioned structure.

Although the photo detecting section structured according to this embodiment uses N-type silicon for the silicon substrate, the rear electrode and the channel stopper and P-type silicon for the P-layer, the operation will remain unchanged even if P-type silicon may be used for the silicon substrate, the rear surface electrode and the channel stopper, and N-type silicon for a portion corresponding to the P-layer. Also, while a photo detector of the PIN structure is taken as an example, a PN-type photo detector may be used which has the silicon substrate 10' and the rear electrode 24 in the same impurity concentration. However, since the PIN-type photo detector is many times superior to the PN-type one in operating speed and light detecting sensitivity, the PIN-type structure is employed also in this embodiment.

Figure 5:
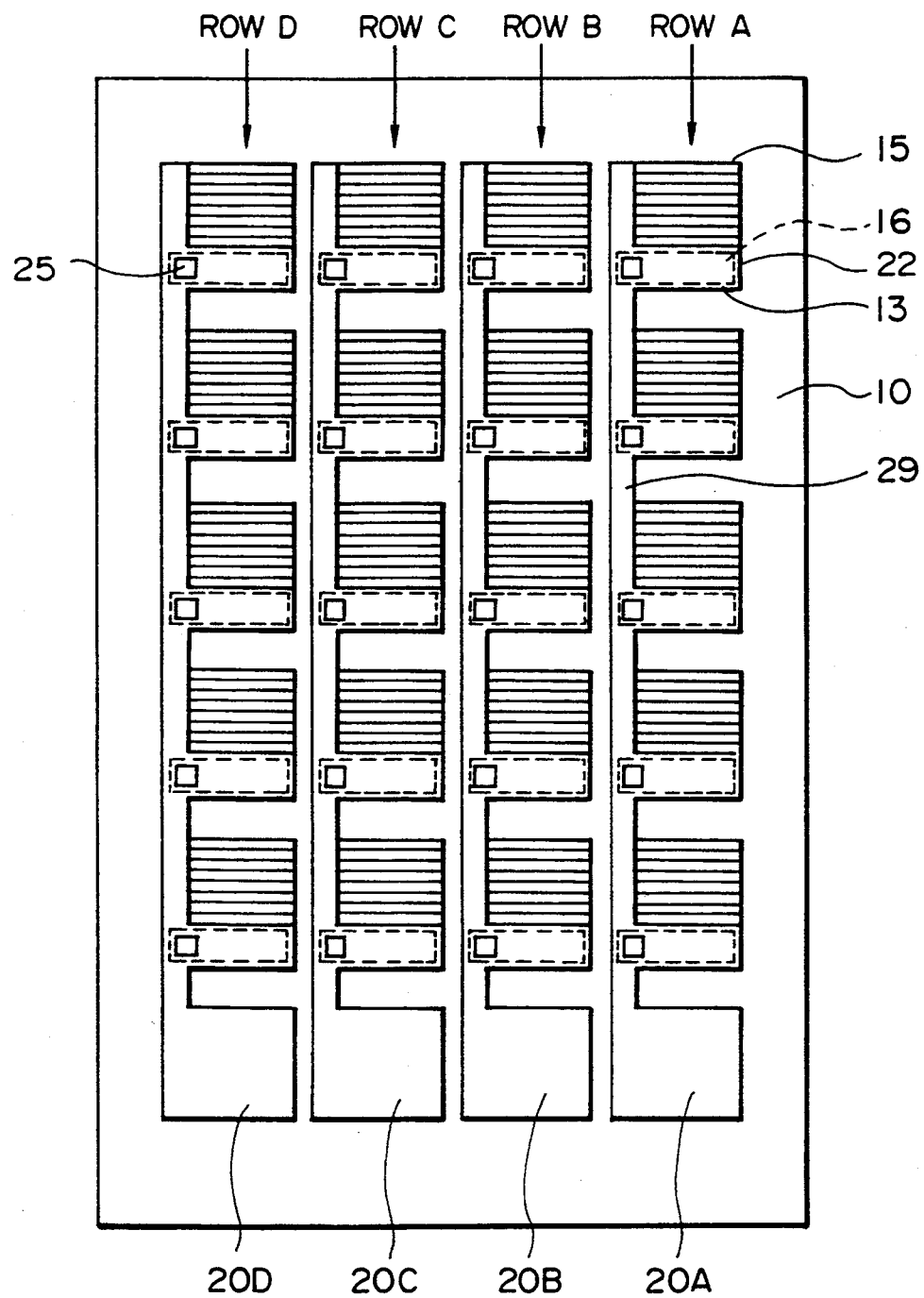
FIG. 5 is a plan view of the photo detector shown in FIG. 3.

Next, the structure of the integrated photo detector 2 will be described in greater detail with reference to FIG. 5. FIG. 5 shows a front elevation of FIG. 3, where the semiconductor substrate 10 is illustrated as being viewed from the direction perpendicular to the semiconductor substrate 10.

In FIG. 5, formed on the semiconductor substrate 10 are P-layers 13, grating couplers 15, and reflective layers 22 as shown in FIG. 4. The respective P-layers 13 in each of rows A–D are connected by wires 29 and contact holes 25 and reach bonding pad 20A–20D, respectively.

Guided light beams generated by the respective grating couplers 15 are detected by the corresponding photo detecting sections 16 independently of each other without being mixed with guided light beams generated by other grating couplers, and are transduced to electric signals, the sum of which is subsequently detected.

Next, explanation will be given of the principles of an increase in the incident angle tolerance and improvement in the light utilizing efficiency which are provided when the grating coupler is split into a multiple number in a direction intersecting the optical axis of a guided light beam.

First, the function of the grating coupler will be explained. It is assumed herein that the length of the grating coupler, which is irradiated with incident light relative to the optical axis direction of the guided light beam, is defined by a term "coupling length."

When the grating coupler is irradiated with incident light, a two-dimensional wave surface is formed from each of the grating couplers in accordance with Huygens principle. The grating coupler can excite a guided light beam into an optical guide only when each wave surface is exactly in phase with the direction of the optical guide. If the coupling length is long, alignment of the phase necessary to the excitation of a guided light beam must be satisfied over a wide extent, so that a tolerated incident angle error relative to the grating coupler is very small. Conversely, if the coupling length is short, the length necessary to the phase alignment is short, so that a larger incident angle error can be tolerated.

Figure 6:
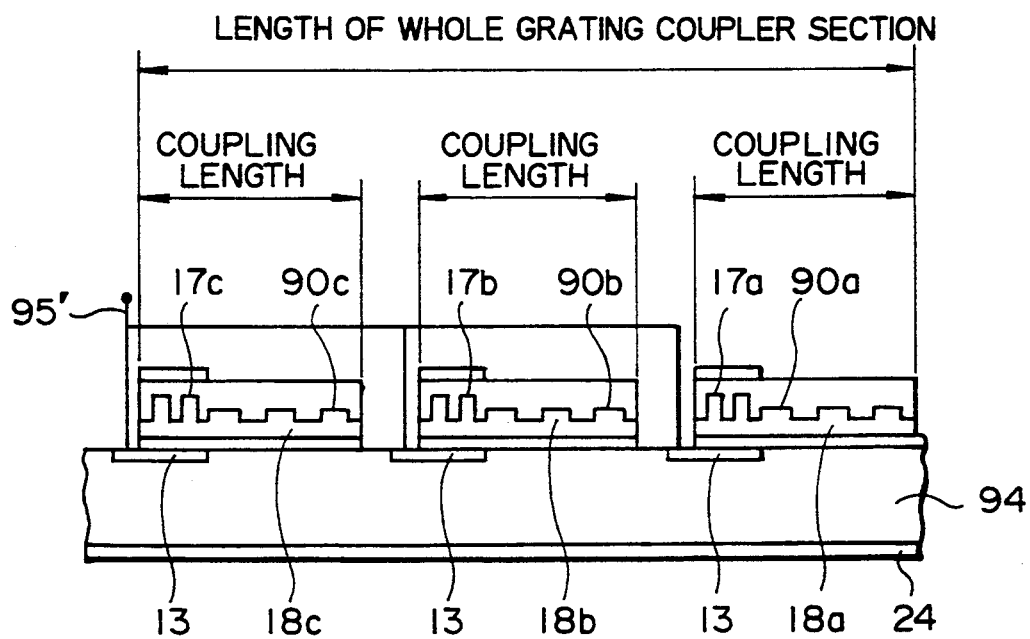
FIG. 6 is a cross-sectional view showing another example of a photo detector according to the present invention.

Thus, in the present invention, a substrate 94 is formed with a rear electrode 24 and P-layers 13 to constitute a plurality of PIN photo detectors as shown in FIG. 6. The substrate 94 is provided with optical guides 18a–18c, independently of each other, which are in turn provided with grating couplers 90a–90c, respectively. Guided light beams excited by the respective grating couplers are transduced to currents in the respective PIN photo detectors by the action of exit diffraction gratings 17a–17c. These currents are summed by a wire 95' and outputted to the outside.

In FIG. 6, the grating coupler section is split into the grating couplers 90a–90c in a direction intersecting with the optical axis direction of the guided light beams such that the guided light beams excited by the respective grating couplers are detected by the corresponding photo detectors independently of each other. However, the grating coupler section is split within a region which is irradiated with the same incident light. The respective detected currents are summed by the wire 95' and outputted to the outside. Since the coupling length can be made shorter than the length of the grating coupler section in such a case, a reduction in the coupling length for permitting higher incident angle error tolerance as well as an extension of the whole length of the grating coupler section for permitting a higher incident light positioning error tolerance can be carried out at the same time. Also, larger incident angle error tolerance also means that the photo detector is resistant to manufacturing errors, wavelength fluctuations and so on, so that the total optical characteristic can be improved.

Next, the light utilizing efficiency of the present invention will be explained with reference to FIG. 7. The coupling efficiency of a grating coupler may be evaluated by overlap integrating the amplitude of incident light and the amplitude of a conjugate exit light beam of a guide light beam on the grating coupler. Note that the conjugate radiated light beam of a guide light beam may be explained in the following manner. Supposing a conjugate wave of a guided light beam, that is a guided light beam, the progressing direction of which is opposite to that of the original guided light beam, this wave reaches from the optical guide to the grating coupler section and radiates therefrom to the outside of-the optical guide. When such a conjugate guided light beam radiates, the exiting light beam is called a conjugate radiated light beam of a guided light beam or simply a radiated beam. Here, the former is selected.

An equation for estimating the incidence efficiency of light is quoted from Equation (4β85) on page 95 of a reference "Optical Integrated Circuit" by Hiroshi Nishihara, Ohm Co., 1985 and written down below:

$$A = \frac{[\int g(z)k(z)dz]}{\int g^2(z)dz \cdot \int k^2(z)dz} \quad (1)$$

where A represents the incidence efficiency of light at the grating coupler, g an amplitude distribution of a conjugate exit light beam of a guided light beam, h an amplitude distribution of incident light, and z one of three-dimensional coordinate axes which corresponds to the progressing direction of a guided light beam.

This equation means that the amplitudes of an incident light beam and a conjugate exit light beam of a guided light beam are normalized such that each integration in the denominator results in one, amplitude curves of the respective light beams are drawn, and an overlapping portion of both curves indicates an amplitude which can be effectively utilized as a guided light beam in good approximation. It should be noted, however, that a precise evaluation for a value must be made by directly executing the overlap integral.

FIG. 7 shows a graph for evaluating the incidence efficiency according to the present invention. Since the normalization is performed on each of the split grating couplers, the curve representative of the incident light amplitude is not wholly continuous. However, it is apparent that the amplitude effectively utilizable as a guided light beam is larger when a grating coupler is split. Consequently, it will be understood that the light utilizing efficiency can be improved by splitting the grating coupler in a direction intersecting with the optical axis of the guided light beam.

Figure 8:
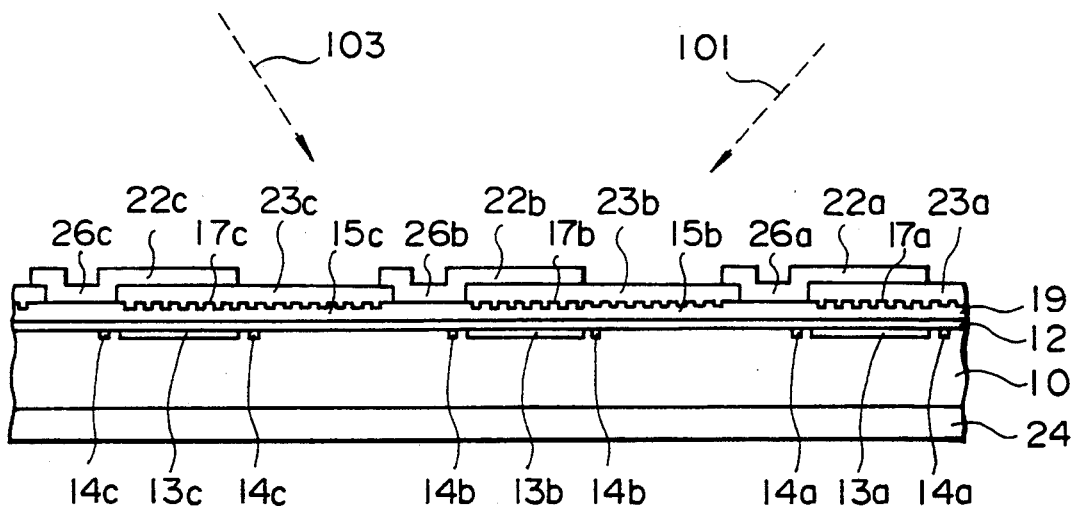
FIGS. 8 and 9 are cross-sectional views respectively showing a further example of the photo detector according to the present invention.

Next, another embodiment of the present invention will be explained with reference to FIG. 8. FIG. 8 shows, similarly to FIG. 4, a partial cross-sectional view of an integrated photo detector taken in a direction substantially parallel to the optical axis of the guided light beam.

In FIGS. 3, 4 and 6, when the optical guides are split in a direction intersecting with the optical axis of the guided light beams, the respective optical guides are spaced apart from each other such that the guided light beams propagating through the respective optical guides will not interact with each other. Alternatively, FIG. 8 shows an example where interactions such as a guide interference phenomenon will not substantially occur among guided light beams propagating through the respective optical guides, while the respective optical guides are continuous.

Referring to FIG. 8, a semiconductor substrate 10 is formed with a rear electrode 24, a buffer layer 12, and an optical guide 19. In addition to this structure, a grating coupler 15a and a clad layer 23a constitute a guided light exciting section, and a radiate diffraction grating 17a, a reflective layer 22a, a P-layer 13a and a channel stopper 14a constitute a guided light detecting section, thus forming one unit corresponding to the structure shown in FIG. 3. Such a unit are also implemented by a combination of a grating coupler 15b, a clad layer 23b, a radial diffraction grating 17b, a reflective layer 22b, a P-layer 13b and a channel stopper 14b; and a combination of a grating coupler 15c, a clad layer 23c, a radial diffraction grating 17c, a reflective layer 22c, a P-layer 13c and a channel stopper 14c.

In the structure shown in FIG. 8, the optical guide 19 is common to all the units and is not actually separated in a manner similar to FIG. 3 or FIG. 4. However, a guided light beam excited by each grating coupler in each unit is absorbed by a corresponding photo detector by way of the radiate diffraction grating and so on in the unit. For this reason, interference by guided light beams in the respective units can be avoided.

To completely eliminate interference by the guided light beams in the respective units, it is necessary to make infinite the length of the guided light absorbing section formed by the radiate diffraction grating and so on in the optical axis direction of the guided light beam. Actually, the guided light beam must be absorbed by a finite length of a guided light absorbing section, which results in leaving slight interference among the guided light beams of the respective units. However, it is not that the so far described effect of increasing the incident angle error tolerance for incident light can be produced only when the interference of the guided light beams of the respective units is completely eliminated. If a guided light beam excited in each unit is attenuated by approximately half in intensity by the photo detector and so on in that unit, the effect of increasing the incident angle error tolerance, the effect of increasing the incidence positioning error tolerance, the effect of increasing the light utilizing efficiency and so on are remarkable. Thus, a relatively short photo detecting section will work well to sufficiently produce these effects.

When the length of the photo detecting section is extremely short, the guided light beams excited in the respective units must be effectively absorbed by a technique other than using the photo detecting section. While there are generally a variety of methods for attenuating a guided light beam, explained here as an example is absorption of a guided light beam using a conductive material which is disposed close to an optical guide. When a conductive material is disposed close to an optical guide, a guided light beam propagating through that portion of the optical guide is absorbed by the dielectric material.

Referring again to FIG. 8, when the reflective layers 22a–22c are made of a conductive material, the clad layers are partially removed by etching to form portions for the respective reflective layers 22a–22c to partially extend close to the optical guide 19. When the reflective layers 22a–22c are formed integral with guided light absorbing portions 26a–26c, the reflective layers 22a–22c, the guided light absorbing portions 26a–26c, and the wires shown in FIG. 4 can be formed of the same material, whereby the manufacturing procedure can be simplified. Alternatively, when the reflective layers 22a–22c are formed of a conductive material, non-conductive materials may be placed near the optical guide, apart from the reflective layers.

The function of the guided light absorbing portions 26a–26c is, in addition to helping absorb the guided light beams if the photo detecting sections cannot sufficiently absorb the guided light beams, to improve the quality of detected signals. This improvement in detected signals will be next explained.

As will be understood from the explanation in connection with FIG. 3, each grating coupler is irradiated with a direct light beam from the semi-conductor 1 in addition to a reflected light beam from the optical disc 4. Specifically, the grating coupler is irradiated with a reflected light beam 101 and a direct light beam 103 in FIG. 8.

When the reflected light beam 101 illuminates, for example, the grating coupler 15b, an excited guided light beam is detected by the guided light detecting section formed by the radiate diffraction grating 17b and so on. Additionally, the direct light beam 103 simultaneously illuminating the grating coupler 15c causes a guided light beam to be excited in the same manner, however, this guided light beam progresses in the direction opposite to the guided light beam excited by the reflected light beam. For this reason, the guided light beam excited by the direct light beam 103 in the grating coupler 15c is detected by a guided light detecting section formed by the exit diffraction grating 17b and so on. This phenomenon occurs in the other units, whereby a signal consequently detected is generated by the sum of the guided light beams excited by the direct light beam and the reflected light beam, thus possibly degrading the signal quality. In such a case, the guided light absorbing portions 26a–26c, if provided in the respective units, will effectively absorb the guided light beams excited by the direct light beam to prevent a signal generated by the direct light beam from invading into the photo detecting section, with the result that the signal quality can be improved.

Figure 9:
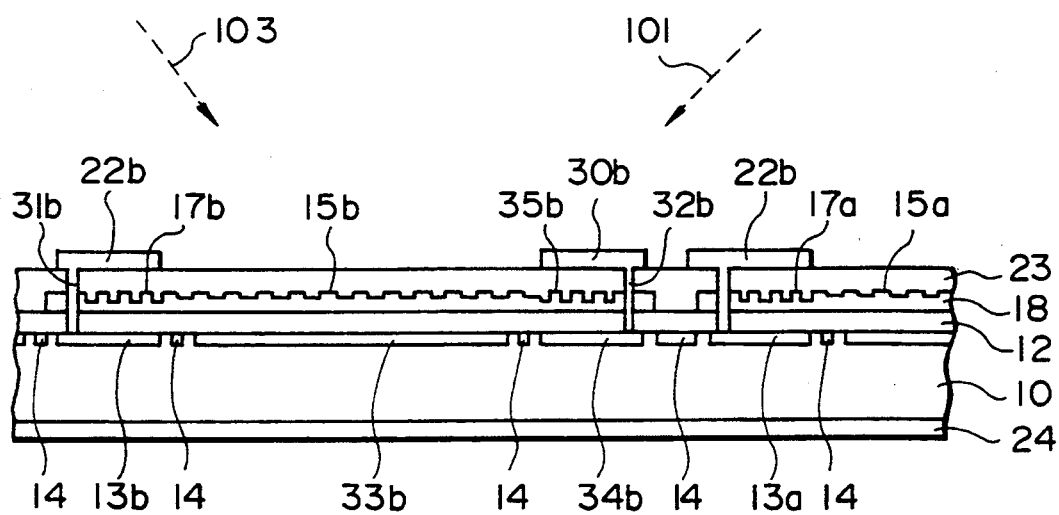

A further embodiment of the present invention will be described with reference to FIG. 9. FIG. 9 shows part of a cross-sectional view of an integrated photo detector, taken in a direction substantially parallel to the optical axis of a guided light beam, similarly to FIG. 3.

Referring to FIG. 9, a semiconductor substrate 10 is formed with a rear electrode 24, a buffer layer 12, an optical guide 18, a clad layer 23, and channel stoppers 14. In addition to these constituents common to all units, a grating coupler 15a constitutes a guided light exciting section, and a radiate diffraction grating 17a, a reflective layer 22a and a P-layer 13a constitute a guided light detecting section, thus completing a single unit. Such a unit is also formed by a combination of a grating coupler 15b, a radiate diffraction grating 17b, a reflective layer 22b and a P-layer 13b.

Since these units are all identical in function, the unit having the grating coupler 15b will be explained here.

A reflected light beam 101 causes the grating coupler 15b to excite a guided light beam which propagates through an optical guide 18. This guided light beam is detected by the guided light detecting section formed by the radiate diffraction grating 17b, the reflective layer 22b, the P-layer 13b and so on. In this event, the optical guide 18 is formed with a guide mirror 31b which causes the guided light beam passing through the radiate diffraction grating 17b to propagate in the opposite direction and again pass through the radiate diffraction grating 17b. In this manner, the provision of the guide mirror 31b causes the guided light beam to pass through the radiate diffraction grating 17b a plurality of times, so that the detection sensitivity of the guided light detecting section is enhanced.

In addition, a direct light beam 103 causes the grating coupler 15b to excite a guided light beam, the intensity of which is detected by a guided light detecting section formed by a radiate diffraction grating 35b, a reflective layer 30b, a P-layer 34b, a guide mirror 32b and so on. This detected intensity is the intensity of the light beam directly emitted from the laser and is nothing more than the oscillation intensity of the laser. Therefore, if the oscillation intensity of the laser is controlled by this detected intensity, a stable operation of the laser can be realized, or a separate photo detector for detecting the oscillation intensity of the laser is rendered unnecessary, thereby simplifying the structure.

As to the guide mirrors 31b and 32b, the guide mirror may be made of a conductive material or a non-conductive material. In a structure where the guide mirrors 31b and 32b are made of a conductive material, the reflective layers 22a–22c, the guided light absorbing portions 26a–26c and the wires 29 shown in FIG. 5 can be all formed of the same material, so that the simplification of the manufacturing procedure is achieved.

In a portion beneath the grating coupler 15b and so on, a P-layer 33b is provided to detect the intensity of a portion in the direct light beam 103 and the reflected light beam 101 from which no guided light beam was excited by the grating coupler. This light detector beneath the grating coupler is provided for preventing such a in the direct light beam 103 and the reflected light beam 101, failing to cause the grating coupler 15b and so on to excite guided light beam, from impinging on the semiconductor substrate 10 as well as effectively removing from the semiconductor substrate 10 electrons and holes generated by the light portion which would otherwise impinge on the semiconductor substrate 10. Stated another way, the P-layer 33b protects such electrons and holes caused by the direct light beam 103 and the reflected light beam 101 from infiltrating into the guided light detecting section due to in-substrate diffusion, and prevents consequent degradation of the signal quality, thereby maintaining the signal quality high. Further, a signal detected by the P-layer 33b beneath the grating coupler may be used for adjusting the relative position between the semiconductor substrate 10 and the semiconductor laser 1, shown in FIG. 2, to readily enable a highly accurate adjustment. This effect will be next described in greater detail.

Figure 10:
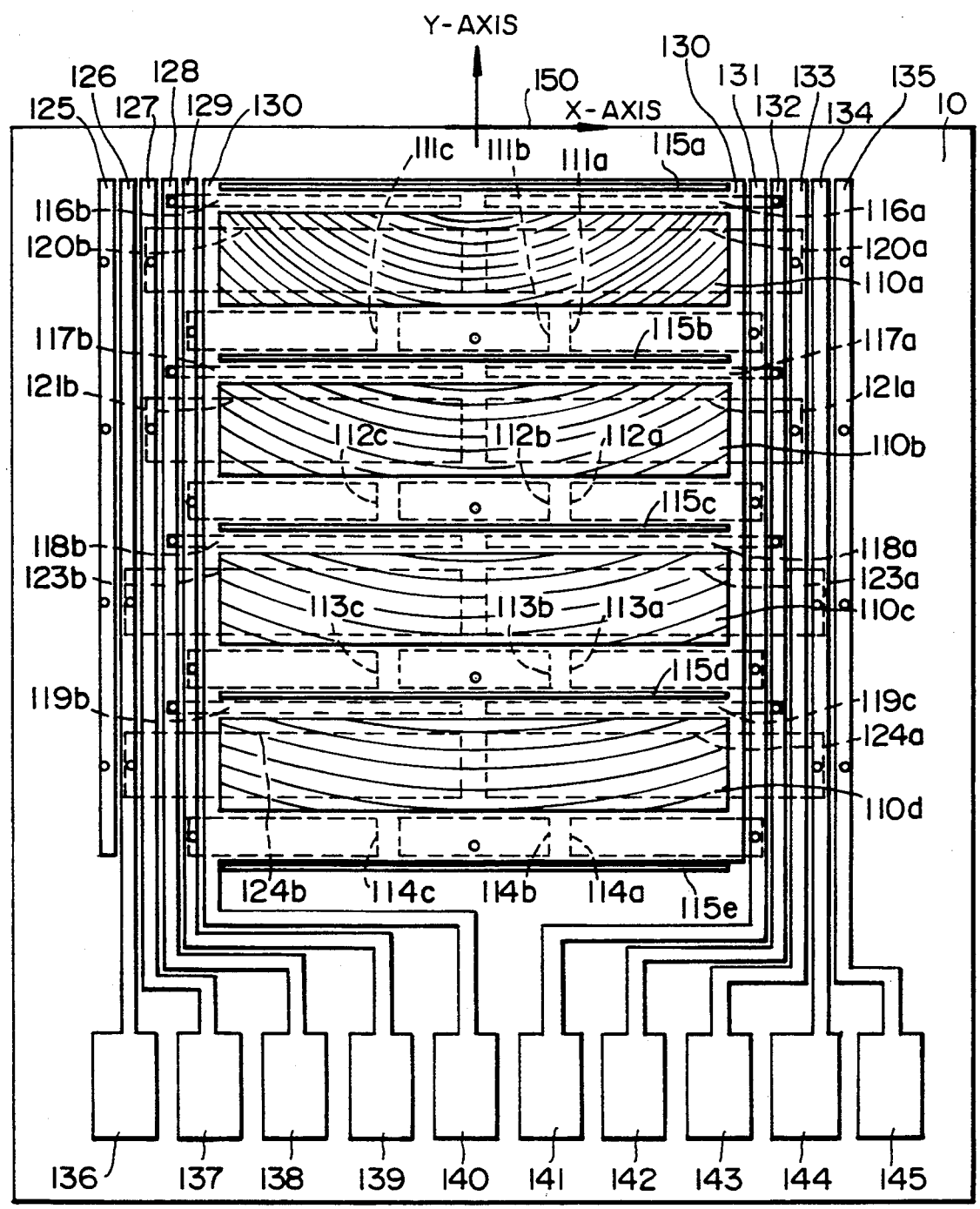
FIG. 10 is a plan view showing a further example of the photo detector according to the present invention.

Next, another embodiment of the present invention will be described with reference to FIG. 10. FIG. 10 shows a front elevation of a photo detector, where a semiconductor substrate 10 is illustrated as being viewed from the direction perpendicular to the semiconductor substrate 10.

Referring to FIG. 10, portions filled with curves represent grating couplers. White circles represent contact holes. Also, regions surrounded by broken lines represent P-layer regions in the substrate. While the channel stopper, the radiate diffraction grating and so on, illustrated in the foregoing cross-sectional views, are not shown in FIG. 10, it will be understood that they still exit and perform the thus far explained operations.

The reflected light beam 101 in FIG. 9 illuminates grating couplers 110a–110d simultaneously. The respective grating couplers are separated from each other in a direction intersecting with the optical axis of the guided light beam.

A guided light beam excited by the reflected light in the grating coupler 110a is detected by P-layers 111a–111c. Here, the reflective layer 22 in FIG. 9 is formed by utilizing part of a wire 130 in FIG. 130. A signal generated in the P-layer 111b is outputted to the wire 130 through a contact hole. Similarly, a signal generated in the P-layer 111a is outputted to a wire 131, and an output from the P-layer 111c to a wire 129, respectively. Also, a guided light beam excited by the grating coupler 110b is detected by P-layers 112a–112c, where a signal generated in the P-layer 112a is outputted to the wire 131; a signal by the P-layer 112b to the wire 130; and a signal by the P-layer 112c to the wire 129, respectively. A guided light beam excited by the grating coupler 110c is detected by P-layers 113a–113c, where a signal by the P-layer 113a is outputted to the wire 131; a signal by the P-layer 113b to the wire 130; and a signal by the P-layer 113c to the wire 129, respectively. A guided light beam excited by the grating coupler 110d is detected by P-layers 114a–114c, where a signal by the P-layer 114a is outputted to the wire 131; a signal by the P-layer 114b to the wire 130; and a signal by the P-layer 114c to the wire 129, respectively.

Upon detecting these signals generated by the reflected light beam, the guide mirror explained in connection with FIG. 9 is utilized, which corresponds to guide mirrors 115b–115e in FIG. 10.

The direct light beam 103 in FIG. 9 also causes the grating couplers 110a–110d to excite guided light beams. A guided light beam excited by the direct light beam in the grating coupler 110a is detected by P-layers 116a and 116b. A signal generated by the P-layer 116a is outputted to a wire 132 through a contact hole, while a signal by the P-layer 116b to a wire 128, respectively. Likewise, a guided light beam excited by the grating coupler 110b is detected by P-layers 117a and 117b. A signal by the P-layer 117a is outputted to the wire 132, while a signal by the P-layer 117b to the wire 128. A guided light beam excited by the grating coupler 110c is detected by P-layers 118a and 118b. A signal by the P-layer 118a is outputted to the wire 132, while a signal by the P-layer 118b to the wire 128. A guided light beam excited by the grating coupler 110d is detected by P-layers 118a and 118b. A signal by the P-layer 118a is outputted to the wire 132, while a signal by the P-layer 118b to the wire 128.

Upon detecting these signals generated by the direct light beam, the guide mirror explained in connection with FIG. 9 is utilized, which corresponds to guide mirrors 115a–115d in FIG. 10. It will be understood that the guide mirrors 115b–115d are double-face mirrors such that they can be utilized for detecting a reflected light beam as well as a direct light beam.

Beneath the grating coupler 110a exist P-layers 120a and 120b for detecting a direct light beam and a reflected light beam. A signal generated by the P-layer 120a is outputted to a wire 133 through a contact hole, while a signal by the P-layer 120b to a wire 127 in a similar manner. Likewise, a signal generated by a P-layer 121a beneath the grating coupler 110b is outputted to the wire 133, while a signal by a P-layer 121b to the wire 127. Also, a signal by a P-layer 123a beneath the grating coupler 110c is outputted to a wire 134, while a signal by a P-layer 123b to a wire 126. Likewise, a signal by a P-layer 12a beneath the grating coupler 110d is outputted to the wire 134, while a signal by a P-layer 124b to the wire 126. Channel stoppers are connected to the wires 125–135.

The wire 126 is connected to a bonding pad 136; the wire 127 to a bonding pad 137; the wire 128 to a bonding pad 138; the wire 129 to a bonding pad 139; the wire 130 to a bonding pad 140; the wire 131 to a bonding pad 141; the wire 132 to a bonding pad 142; the wire 133 to a bonding pad 143; the wire 134 to the bonding pad 144; and the wire 135 to the bonding pad 145, respectively. Signals are outputted to external circuits through these bonding pads.

In the structure described above, a focus error signal, a track error signal and a read signal are produced by the following processing. Note that each term on the right side of each equation indicates the intensity of a signal from the bonding pad designated the number in parenthesis.

$$\text{(Focus Error Signal)} = (139) - (140) + (141)$$
$$\text{(Track Error Signal)} = (139) - (141)$$
$$\text{(Read Signal)} = (139) + (140) + (141)$$

The intensity of the direct light beam from the semiconductor laser 1 of FIG. 3, which is detected for performing an emission intensity control, is represented by the following equation:

$$\text{(Direct Light Intensity)} = (138) + (142)$$

Next, description will be made as to how to adjust the relative positional relation between the semiconductor laser 1 and the semiconductor substrate 10 in FIG. 3. This adjustment is performed in a condition that the optical disc 4 in FIG. 4 is removed such that the direct light beam solely exists. Here, coordinate axes are set in FIG. 10 for explanation. Specifically, the y-axis and the x-axis are set in the propagating direction of the direct light beam and in the direction perpendicular thereto, respectively, in a plane in which the semiconductor substrate 10 is placed.

First, the semiconductor laser 1 is adjusted so as to illuminate a central portion of the grating couplers in FIG. 10. Specifically, the coordinates of an illuminated position are represented by the following equations:

$$\text{(x-axis of Illuminated Position)} = (144) + (143) - (137) - (136)$$
$$\text{(y-axis of Illuminated Position)} = (143) + (137) - (144) - (136)$$

The semiconductor laser 1 is adjusted such that the detected illuminated position is not offset in the x-direction or in the y-direction, or the position represents an expected value. The relative positional relation between the semiconductor laser 1 and the semiconductor substrate 10 in FIG. 3 is adjusted by adjusting the position of the semiconductor laser so as to maximize the intensity of the direct light beam while maintaining the illuminated position detected in this manner.

Next, the relative positional relation is adjusted between the semiconductor substrate 10 and the objective lens 3 such that a light beam reflected by the semiconductor substrate 10 forms the best spot in FIG. 3.

If the reflective surface of the optical disc 4 exists at the focus position of the objective lens 3 in FIG. 3, a reflected light beam and a direct light beam form a conjugate wave surface. Explaining more specifically, since the intensity of a guided light beam excited by the direct light beam is at its maximum, the intensity of a guided light beam excited in the optical guide in FIG. 10 by the reflected light beam automatically becomes maximal. In other words, the best adjustment can be easily carried out as a whole without additionally performing a more complicated adjustment for the reflected light beam.

Figure 11:
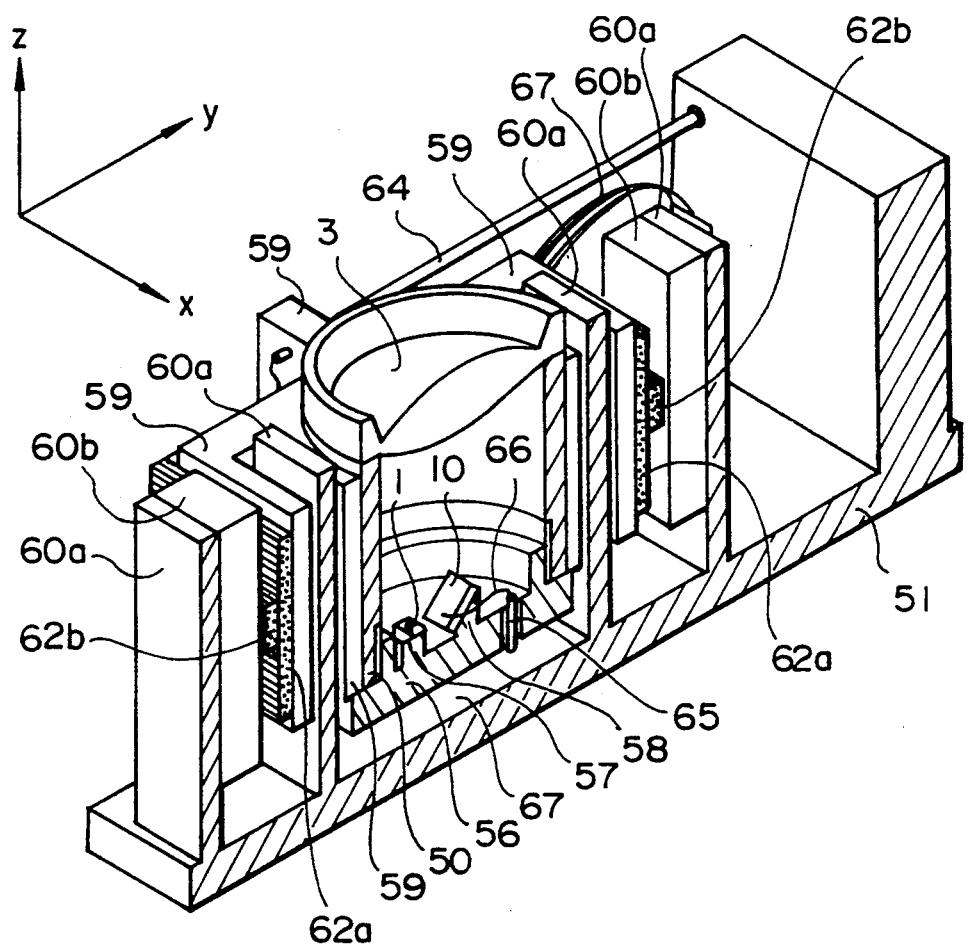
FIG. 11 is a perspective view showing, partially in section, portions of the photo detector, a light source and a lens system in FIG. 1.

Next, a further embodiment of the present invention will be described with reference to FIG. 11. FIG. 11 is a cross-sectional view showing an example of a structure arranged in the outer housing 51 and the housing 50 in FIG. 1.

For explanation, fixed coordinate axes are set on the outer housing in FIG. 11. The z-axis is selected in the direction of the optical axis of the objective lens 3; the x-axis in the radial direction of the optical disc in FIG. 1; and the y-axis in the direction perpendicular to the x-axis and the z-axis such that the coordinate-system is right-handed.

A housing base 56 is formed with a laser mount 57 for fixing the semiconductor laser 1 thereon and a substrate mount 58 for fixing the semiconductor substrate 10 thereon. The housing base 56 is provided with a plurality of signal take-out pins 65 which are electrically insulated from the housing base 56. The bonding pads 20 as shown in FIG. 3 made on the substrate 10 are electrically connected through the signal take-out pins 65 and wires 66 of FIG. 11. Likewise, a plurality of signal paths formed by bonding pads, signal take-out pins and wires are provided. The signal take-out pins 65 are connected to flexible wires 67 through which the semiconductor laser 1 is supplied with electric power and signals detected by the semiconductor substrate 10 are delivered to the system controller 70 in FIG. 1.

The housing base 56 is fixed to the housing 50. The objective lens 3 is also fixed to the housing 50. The connecting plane of the objective lens 3 with the housing 50 is in parallel with the xy-plane. Before mutually fixing the objective lens 3 to the housing 50, the position of the objective lens 3 is adjusted by moving the same on the connecting plane so as to minimize an aberration amount of a light beam converged by the objective lens 3. After the adjustment is completed, the objective lens 3 is fixed to the housing 50 by a bonding agent or the like.

The interior of the above structure is sealed by the objective lens 3, the housing 50 and the housing base 56, and an inert gas is encapsulated inside the structure. The objective lens 3 serves as an optical window of this sealed structure. In this manner, by integrating the optics in a sealed structure as well as inputting and outputting light beams through the optical window, a reduction in size and improvement in reliability can be carried out for the optics.

The housing 50 is fixed to an auxiliary housing 59. Additionally, a focusing electromagnetic coil 62a and a tracking electromagnetic coil 62b are also fixed to this auxiliary housing 59.

The outer housing 51 comprises a magnetic yoke 60a to which a magnet 60b is fixed. The focusing electromagnetic coil 62a and the tracking electromagnetic coil 62b are held in a magnetic field generated by these magnetic yoke 60a and magnet 60b.

The auxiliary housing 59 is connected to the outer housing 51 through a plurality of spring suspensions 64. The housing 50 is arranged movable in the x-direction, i.e., the tracking direction and in the z-direction, i.e., the focusing direction by elastic deformation of the spring suspensions 64.

The system controller 70 in FIG. 1 applies currents to the focusing electromagnetic coil 62a and the tracking electromagnetic coil 62b to perform focusing and tracking adjustment.

Upon focusing adjustment and tracking adjustment, since the whole optics integrated to the housing 50 is moved, the optics is free from offset of detected signals, degradation of the signal quality such as decrease in the sensitivity and so on, which would otherwise occur during focusing adjustment and tracking adjustment, whereby an optimal operation is always ensured, with the result that the reliability as the apparatus of FIG. 1 is improved.

Since no degradation of the signal quality is present due to the movement of the housing 50 during focusing adjustment and tracking adjustment, the housing 50 can be moved over a long distance. For this reason, the reliability can be maintained high even with an optical disc presenting large warp and/or deflection. Also, since a movable track range of the housing 50 can be made wider than the outer housing 51 because of the operating speed of the housing 50 higher than that of the outer housing 51 driven by the rough movement electromagnetic coil 71 in FIG. 1, the access speed is increased.

As described above, the utilization of the integrated photo detector 2 in FIG. 1 having the incidence coupling section split in a direction intersecting the optical axis direction of the guided light beam produces effects of easily performing the optical adjustment, readily obtaining high optical performance capabilities, ensuring a stable optical performance against manufacturing errors, environmental errors, wavelength fluctuations and so on, and constructing a highly reliable optical pickup. Also, an optical information processing apparatus realized by utilizing such an optical pickup as shown in FIG. 1 is highly reliable, easy to manufacture and adjust, and small in size.

Figure 12:
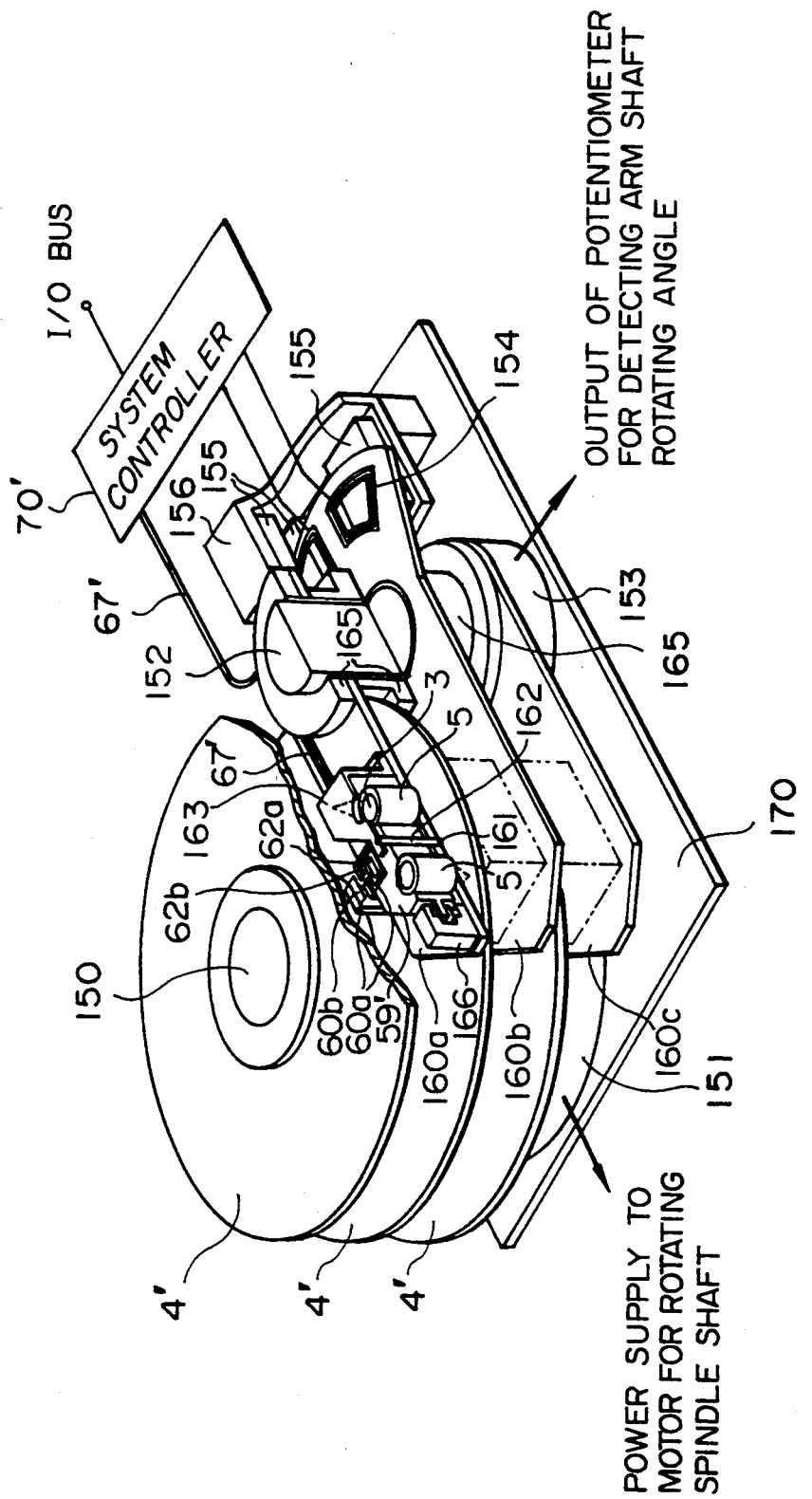
FIG. 12 is a perspective view showing, partially in section, another embodiment of the present invention.

Next, another embodiment of the present invention will be described with reference to FIG. 12. FIG. 12 is a perspective view of the embodiment partially including cross-section for explanation.

Referring to FIG. 12, an optical pickup assembly 5 includes a housing 50, a housing base 56, and an objective lens 3 and internal parts arranged in a sealed structure formed by these constituents, as shown in FIG. 11.

The assembly 5 is fixed to an auxiliary housing 59'. Also fixed to the auxiliary housing 59' are a focusing electromagnetic coil 62a and a tracking electromagnetic coil 62b. These electromagnetic coils are placed in a magnetic field generated by a yoke 60a and a magnet 60b attached to a swing arm 160a. The auxiliary housing 59' also has an axially slidable portion 162 which is fitted into an axially sliding shaft 161 fixed to the swing arm 160a and a reinforcing member 163.

The auxiliary housing 59' accommodates a single or a plurality of assemblies 5. FIG. 12 illustrates that there are two assemblies 5 at positions axially symmetric relative to the axially slidable portion 162. These assemblies 5 are located such that the optical axis of the objective lens is in parallel to or substantially in parallel with the sliding shaft 161.

The swing arm 160a is provided with a position detector 166 for detecting a swing angle of the auxiliary housing 59' about the sliding shaft 161.

The assemblies 5, the position detector 166, the focusing electromagnetic coil 62a and the tracking electromagnetic coil 62b are electrically connected to the system controller 70' through flexible wires 67'.

Incidentally, there may be provided a single or a plurality of swing arms 160a. In this embodiment, a plurality of arms are provided, which are designated 160b and 160c, in addition to the swing arm 160a. It should be noted that the swing arms 160b, 160c are provided with the same structure as the swing arm 160a. When a plurality of swing arms are provided in this manner, they are linked to each other by link members 165. Each swing arm is arranged swingable about an arm swinging shaft 152 fixed to a base 170. The swing action of the swing arm about the arm swinging shaft 152 is produced by applying a current to a swing magnetic coil 154 placed in a magnetic field generated by a magnetic yoke 156 and a magnet 155 which are both fixed to the base 170. Also, a swing angle about the arm swinging shaft 152 is detected by a rotating angle potentiometer 153 which transfers a signal indicative of a detected angle to the system controller 70'.

The system controller 70' is externally supplied with electric power. The system controller 70' in turn supplies electric power to an optical disc rotating motor 151 fixed to the base 170 for rotating the optical disc 4' connected to a rotating shaft 50. While FIG. 12 illustrates three optical discs 4', the number of discs may be single or plural. With a single disc, the height of the apparatus can be reduced, and the optical disc 4' is easily exchanged. Conversely, with a plurality of discs, the storage capacity as the whole apparatus is increased.

The system controller 70' supplies electric power to the assembly 5 for allowing the semiconductor laser built therein to emit laser light. Also, in accordance with a focus error signal detected by the assembly 5, the system controller 70' applies a current to the focusing electromagnetic coil 62a to move the assembly 5 in the axial direction of the axially sliding shaft 161 so as to position the focal point of the objective lens 3 on the information recording surface of the optical disc 4' for focus adjustment.

The system controller 70' receives an information access request signal from an external apparatus through an I/O bus. In response thereto, the system controller 70' applies a current to the swing magnetic coil 154 to have the swing arms 160a–160c swing. The system controller 70' also applies a current to the tracking electromagnetic coil 62b to have the auxiliary housing 59 swing about the sliding shaft 161. By such operations, target information is accessed. For controlling to drive the swing magnetic coil 154 and the tracking electromagnetic coil 62b, a signal generated by the rotating angle potentiometer 153 and a signal by the position detector 166 may also be used other than a tracking detection signal from the assembly 5. In this case, since the number of state detections for the system control is increased, stabilization of the system and faster access can be carried out.

Each assembly pair 5 mounted on the swing arms 160a–160c may have the respective objective lenses 3 oriented in the same direction or in the opposite directions to each other. When oriented in the same direction, the plurality of assemblies 5 read information stored on the same recording surface of the same optical disc 4', so that the transfer rate can be increased. Conversely, when oriented in the opposite directions, the two assemblies 5 on one swing arm read information on recording surfaces of different optical discs 4'. Thus, information on both surfaces of the optical discs 4' can be read by the assemblies 5 mounted on the plurality of swing arms, thereby increasing the information amount recorded on the optical disc 4'.

The utilization of the integrated photo detector 2 shown in FIG. 1, where the incidence coupling section is split in a direction intersecting with the optical axis direction of the guided light beam, allows the optical information processing apparatus as shown in FIG. 12 to be compact, highly reliable, and easy to manufacture and adjust. Further, the access mechanism of a swing arm type provides a high speed access or a larger capacity of information storage when a plurality of optical discs are used.

Figure 13:
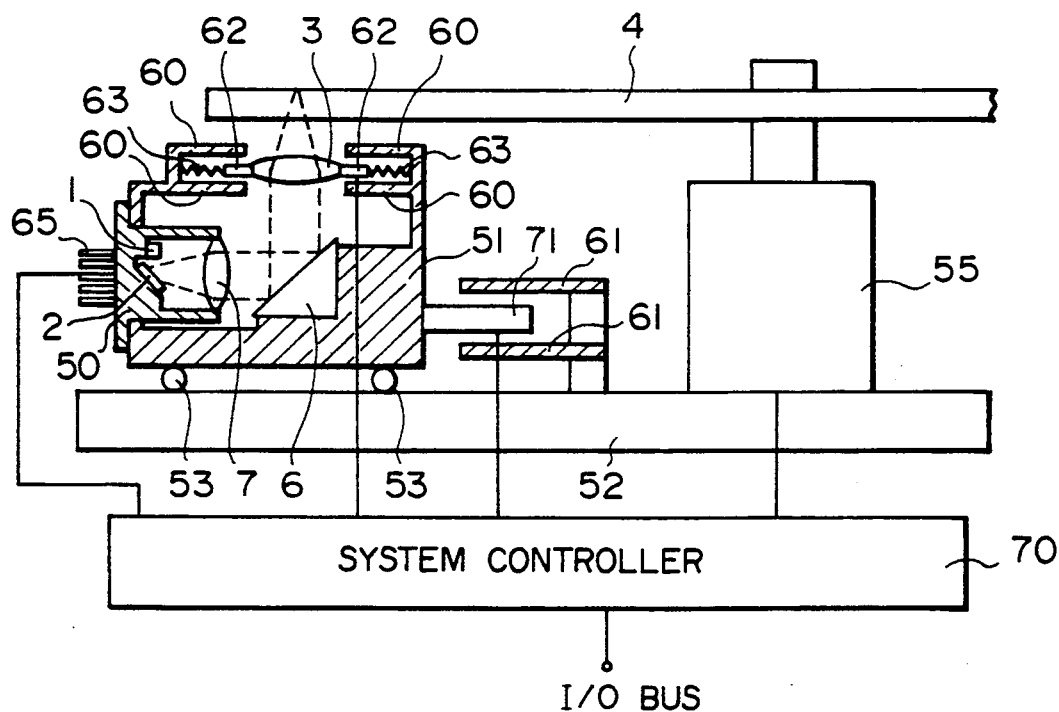
FIGS. 13 and 14 are front elevations respectively showing, partially in section, a further embodiment of the present invention.

Next, a further embodiment of the present invention will be described with reference to FIG. 13. In FIG. 13, A light beam emitted from a semiconductor laser 1 fixed to a housing 50 and driven by a system controller 70 illuminates an integrated photo detector 2, the reflected light beam of which passes through a collimator lens 7 fixed to the housing 50 to be collimated. This collimated light beam is reflected by a reflective mirror 6 and converged by an objective lens 3, and then illuminates an optical disc 4. The light beam reflected by the optical disc 4 again passes through the objective lens 3 and the collimator lens 7 to illuminate the integrated photo detector 2. It should be noted that the structure of the integrated photo detector 2 is similar to that so far explained.

The housing 50 is fixed to an outer housing 51. The objective lens 3 is supported by a suspension 63 so as to be movable in the direction perpendicular to the recording surface of the optical disc 4 and in the radial direction of the optical disc 4. Signals are detected by the integrated photo detector 2 by a method so far explained, and transferred to the system controller 70 through pins 65.

The system controller 70, in responsive to a detected focus error signal, applies a current to an electromagnetic coil 62 arranged in a magnetic circuit 60 to move the objective lens 3 in the direction perpendicular to the recording surface of the optical disc 4 for focus control.

Also, the system controller 70, in response to a detected track error signal and an information access request from an external apparatus through an I/O bus, applies a current to a rough movement electromagnetic coil 71 to move the outer housing 51 mounted on a straight rail mechanism 53 in the radial direction of the optical disc 4. Further, the system controller 70 applies a current to an electromagnetic coil 62 arranged in the magnetic circuit 60 to move the objective lens 3 in the radial direction of the optical disc 4. By thus moving the outer housing 51 and the objective lens 3, a track control is performed for the optical disc 4.

The system controller 70 rotates the optical disc 4 by means of a rotary motor 55.

The system controller 70 transfers read signals derived as described above to external apparatus through the I/O bus.

For performing the above operations, the system controller is supplied with electric energy from an optional external power supply, not shown in the drawing.

By employing the structure as described above, the weight of a portion driven by the electromagnetic coil 62 is decreased, which results in stabilizing the driving operation and improving the reliability against external disturbances. Additionally, the reliability of the whole optical information processing apparatus shown in FIG. 13 can be improved in a similar manner.

Figure 14:
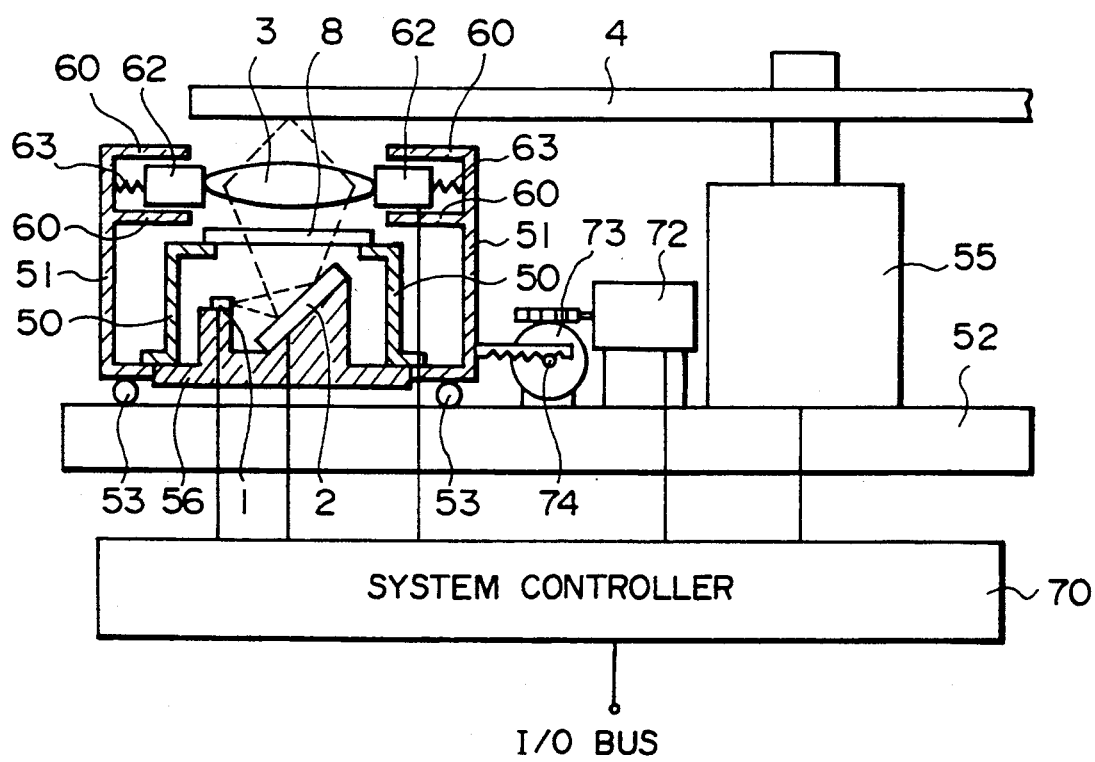

Next, another embodiment of the present invention will be described with reference to FIG. 14. In FIG. 14, a light beam emitted from a semiconductor laser 1 fixed to a housing base 56 and driven by a system controller 70 illuminates an integrated photo detector 2. The reflected light beam from the photo detector 2 passes through an optical window 8 fixed to a housing 50 and is converged by an objective lens 3 to illuminate an optical disc 4. The light beam reflected by the optical disc 4 again passes through the objective lens 3 and the optical window 8 and illuminates the integrated photo detector 2. The structure of the integrated photo detector is similar to that so far explained.

The housing base 56, the housing 50 and the optical window 8 are connected with each other to form a sealed structure. The housing base 56 is fixed to an outer housing 51.

The objective lens 3 is supported by a suspension 63 so as to be movable in the direction perpendicular to the recording surface of the optical disc 4 and in the radial direction of the optical disc 4.

In response to a focus error signal detected by the integrated photo detector 2 by the method so far explained, the system controller 70 applies a current to an electromagnetic coil 62 arranged in a magnetic circuit 60 to move the objective lens 3 in the direction perpendicular to the recording surface of the optical disc 4 for focus control.

Also, in response to a detected track error signal and an information access request from an external apparatus through an I/O bus, the system controller 70 applies a current to a rough movement motor 72 to rotate the motor. The rotation of the motor 72 is decelerated by a worm gear mechanism 73 and moves through a rack and pinion mechanism 74 the outer housing 51 mounted on a straight rail mechanism 53 in the radial direction of the optical disc 4. The system controller 70 further applies a current to an electromagnetic coil 62 arranged in the magnetic circuit 60 to move the objective lens 3 in the radial direction of the optical disc 4. In this manner, the outer housing 51 and the objective lens 3 are moved to perform a track control for the optical disc 4.

The system controller 70 rotates the optical disc 4 by means of a rotary motor 55. The system controller 70 also transfers read signals derived as described above to external apparatus through the I/O bus.

For performing the above operations, the system controller 70 is supplied with electric energy from an optional external power supply, not shown in the drawing.

The structure as described above, when employed, can realize a highly reliable apparatus even if the base 52 is excessively loaded or vibrated when the optical information processing apparatus disclosed herein is transported or utilized outdoors.

Figure 15:
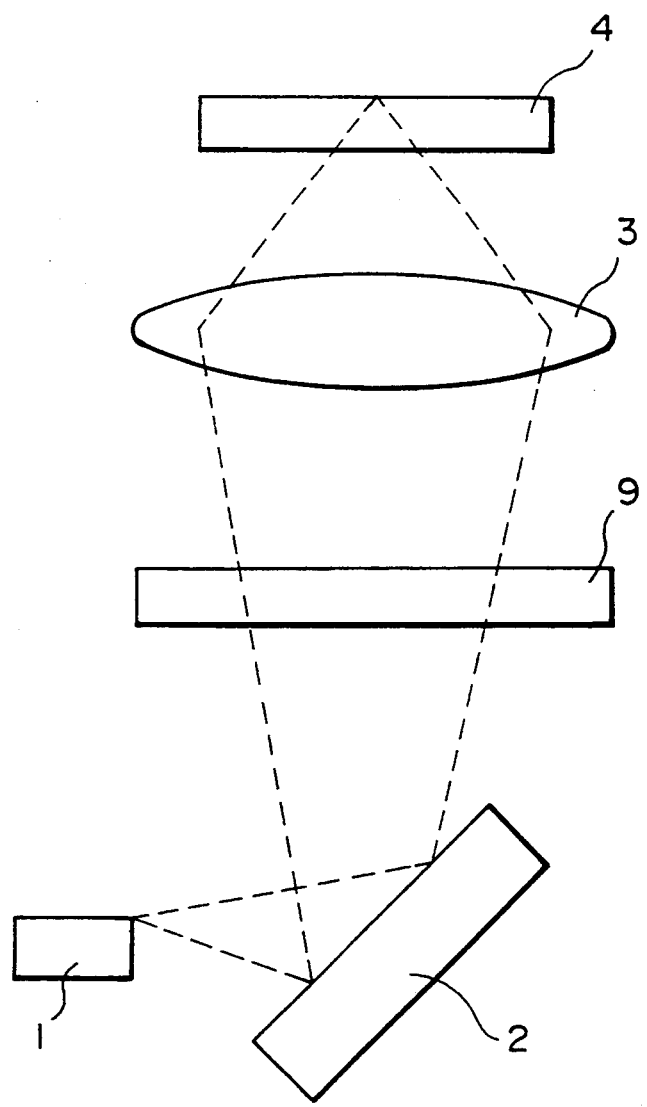
FIG. 15 is a diagram showing an example of a portion of an optical structure in the apparatus of the present invention.

Next, a yet another embodiment of the present invention will be described with reference to FIG. 15. FIG. 15 solely shows optics which constitutes the apparatus of the present invention. While this embodiment could be originally incorporated into an optical information processing unit as shown in FIGS. 1, 2, 13 and 14, the optics only will be explained here for avoiding repeated explanation.

Referring to FIG. 15, a light beam emitted from a semiconductor laser 1 is reflected by an integrated photo detector 2, passes through a wavelength plate 9 and thereafter passes through an objective lens 3 to be converged onto an information surface of an optical disc 4. The light beam reflected by the optical disc 4 again passes through the objective lens 3 and the wavelength plate 9 to be incident on the integrated photo detector 2. The function of the integrated photo detector 2 is similar to that so far explained.

When the reflected light beam from the optical disc is made incident on an optical guide formed in the integrated photo detector 2, an optimal incident angle may vary depending on the direction of polarization of the incident light beam. More specifically, the optimal incident angle may vary depending on whether a TE (Transverse Electric) mode or a TM (Transverse Magnetic) mode is excited in the plane optical guide.

Even if an incident light beam intended to excite the TM mode is incident on an incidence coupling section at an incident angle for exciting the TE mode, no guided light beam will be excited, but the reflectivity of the incidence coupling section will be increased. On the contrary, even if an incident light beam intended to excite the TE mode is incident on the incidence coupling section at an incident angle for exciting the TM mode, no guided light beam will be excited, but the reflectivity of the incidence coupling section will be increased.

To avoid such inconvenience, the incident angle with respect to the integrated photo detector 2 and the shape of the diffraction grating are set, for example, to excite the TE mode. Also, the polarization direction is selected for the semiconductor laser 1 such that a direct light beam from the semiconductor laser 1 causes the TM mode to be excited. In this manner, very few guided light beam will be excited in the optical guide, while the reflectivity of the direct light beam will be increased, resulting in increasing the amount of the laser beam reaching the optical disc 4. The function of the wavelength plate 9 is to force the reflected light beam from the optical disc 4 to excite the TE mode in the integrated photo detector 2. In this manner, a reflected light beam is effectively converted to a guided light beam. Since the above structure causes a total light utilizing efficiency to increase, the signal quality is improved. Also, if the signal quality is constant, the intensity of the light beam emitted from the semiconductor laser 1 can be lowered, thereby making it possible to also reduce energy consumption and suppress degradation of the reliability due to heat generation to the minimum.

The effects as described above can be produced in the completely same manner when the incident angle with respect to the integrated photo detector 2 and the shape of the diffraction grating are set to excite the TM mode, and the direction of the polarization of the semiconductor laser 1 is selected such that the direct light beam from the semiconductor laser 1 will excite the TM mode, so that the reflected light beam from the optical disc 4 causes the TM mode to be excited in the integrated photo detector 2.

The wavelength plate 9 may be mounted at the position of the optical window in FIG. 14 to serve as not only a wavelength plate but also an optical window. In this manner, a highly reliable optical information processing apparatus can be realized with less number of parts.

Figure 16:
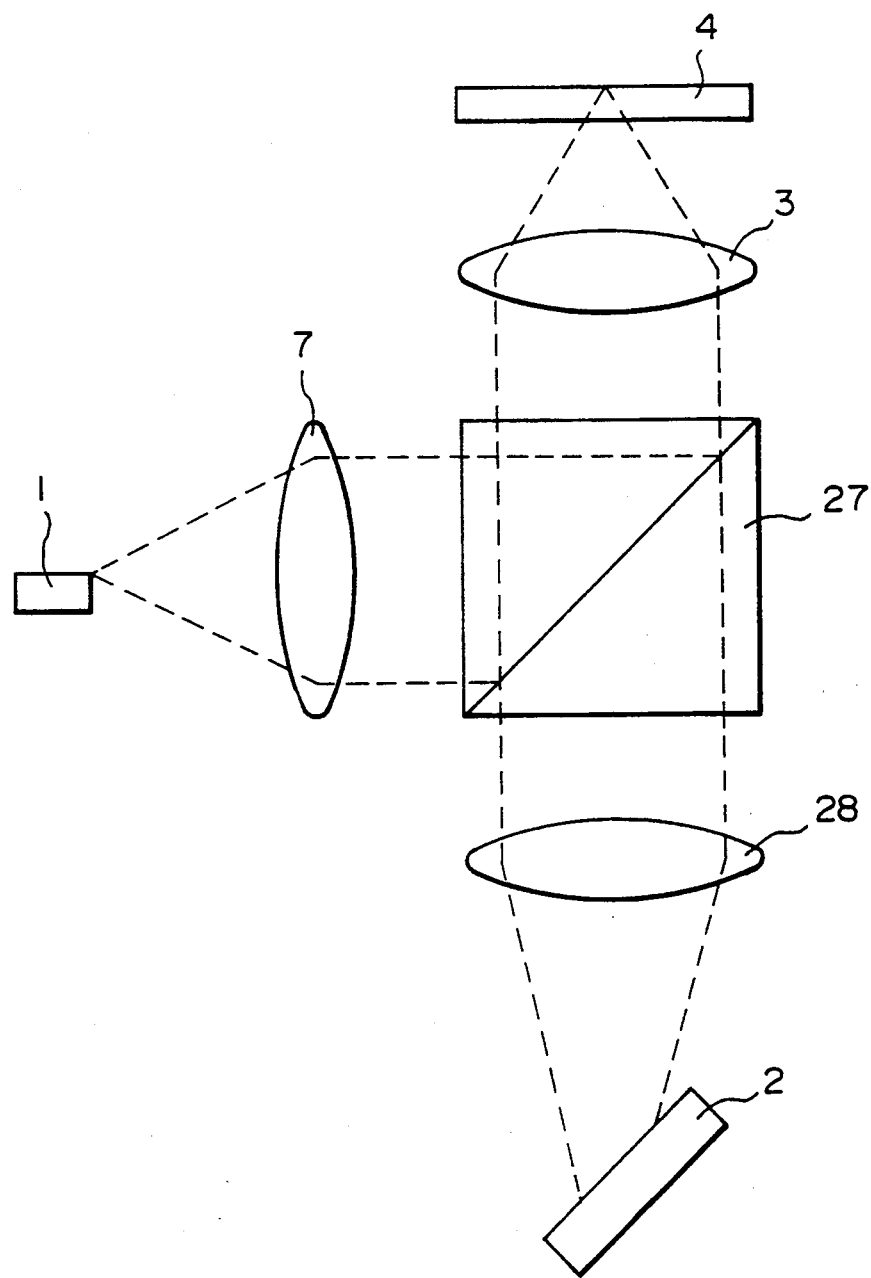
FIGS. 16 and 17 are diagrams respectively showing another example of a portion of the optical structure in the apparatus of the present invention.

Next, another embodiment of the present invention will be described with reference to FIG. 16. FIG. 16 solely extracts optics constituting the present invention. While the optics could be originally incorporated in an optical information processing apparatus as shown in FIGS. 1, 12, 13 and 14, the optics only will be explained for avoiding repeated explanation.

Referring to FIG. 16, a light beam emitted from a semiconductor laser 1 is collimated by a collimator lens 7 and reflected by a beam splitter 27, passes through an objective lens 3 and is converged on an information surface of an optical disc 4. The light beam reflected by the optical disc 4 again passes through the objective lens 3 and the beam splitter 27, is converged by a converging lens 28 and impinges on an integrated photo detector 2.

In the structure as described above, the integrated photo detector 2 is not irradiated with light beams such as a direct light beam from the semiconductor laser 1, which are not necessary to generate signals, but only with the reflected light beam from the optical disc 4, whereby the signal quality is improved. In addition, while the reflective layer 22 in FIG. 4 was discussed to have a function of preventing the direct light beam from impinging on the photo detector, the direct light beam does not reach the integrated photo detector 2, so that this reflective layer can be omitted, thus simplifying the structure.

Next, a still further embodiment of the present invention will be described with reference to FIG. 17. While FIG. 17 only extracts an incidence coupling section of the present invention, it goes without saying that this section may be incorporated in a system as so far discussed.

Figure 17:
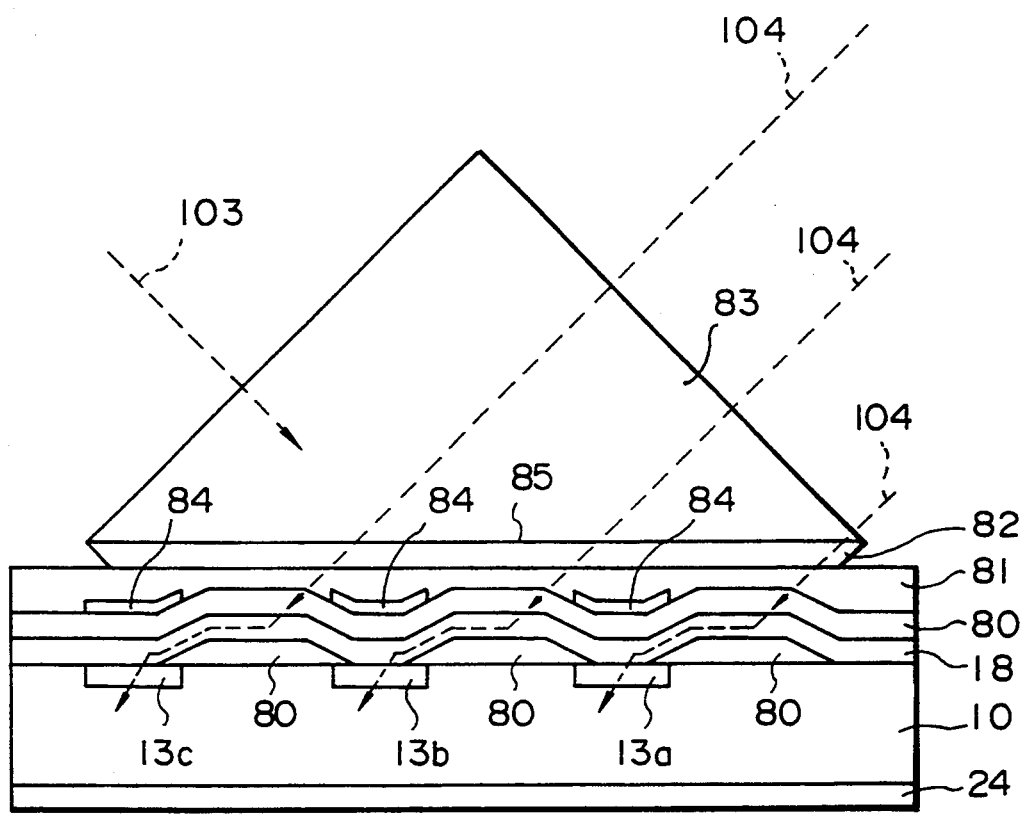

FIG. 17 illustrates an example where a prism coupler is applied to the incidence coupling section. In FIG. 17, a semiconductor substrate 10 is formed with P-layers 13a-13c and a rear electrode 24 which constitute a plurality of PIN photo detectors. The semiconductor substrate 10 is also formed with a buffer layer 80, the thickness of which is made thinner on the P-layers 13a-13c. An incident light beam 104 impinges on an incident prism 83. The reflectivity of the prism 83 is selected such that the incident light beam 104 is fully reflected by a bottom face 85 of the incident prism 83. The incident light beam 104, when fully reflected by the bottom face 85, causes an evanescent wave to occur outside the incident prism 83. If an optical guide 18 is placed in a region of the evanescent wave, a guided light beam is excited inside the optical guide 18.

Since the optical guide 18 approaches the PIN structure in vicinity of the P-layer 13a-13c, a guided light beam excited by each region of the optical guide segmented by the respective P-layers is independently absorbed by the semiconductor substrate 10 and outputted to the outside.

Formed on the optical guide 18 is a buffer layer 81. On the buffer layer 81, the incident prism 83 is attached through a gap retainer 82 formed of a bonding agent, matching oil or air gap.

When unnecessary disturbing light exists in addition to the incident light beam 104, a reflective layer 84 may be arranged at a position corresponding to each of the P-layers through a buffer layer 80 which is interposed between the reflective layer 84 and the optical guide 18. In this manner, only the incident light beam 104 can be selectively detected, thereby making it possible to improve the signal quality.

Sometimes, the incident prism 83 may be irradiated with a direct light beam 103 as shown in FIG. 8 such that the reflected light beam by the bottom face of the incident prism 83 illuminates the optical disc 4 of FIG. 1 or 3. Then, the reflected light beam from the optical disc 104 is utilized as the incident light beam 104 of FIG. 17. This can form an integrated photo detector having similar functions to that shown in FIG. 1 or the like.

The optical guide 18 may be provided with the guided light absorbing portion 26 as shown in FIG. 8, the guide mirror 31, and a photo detector for a direct light beam as shown in FIG. 9. The provision of such additional means allows the integrated photo detector having the optics of FIG. 17 to have similar functions to the integrated photo detectors of FIGS. 8 and 9.

As the foregoing, when an incident prism is used, the grating coupler can be removed, thereby simplifying the structure of the integrated photo detector.

Figure 18:
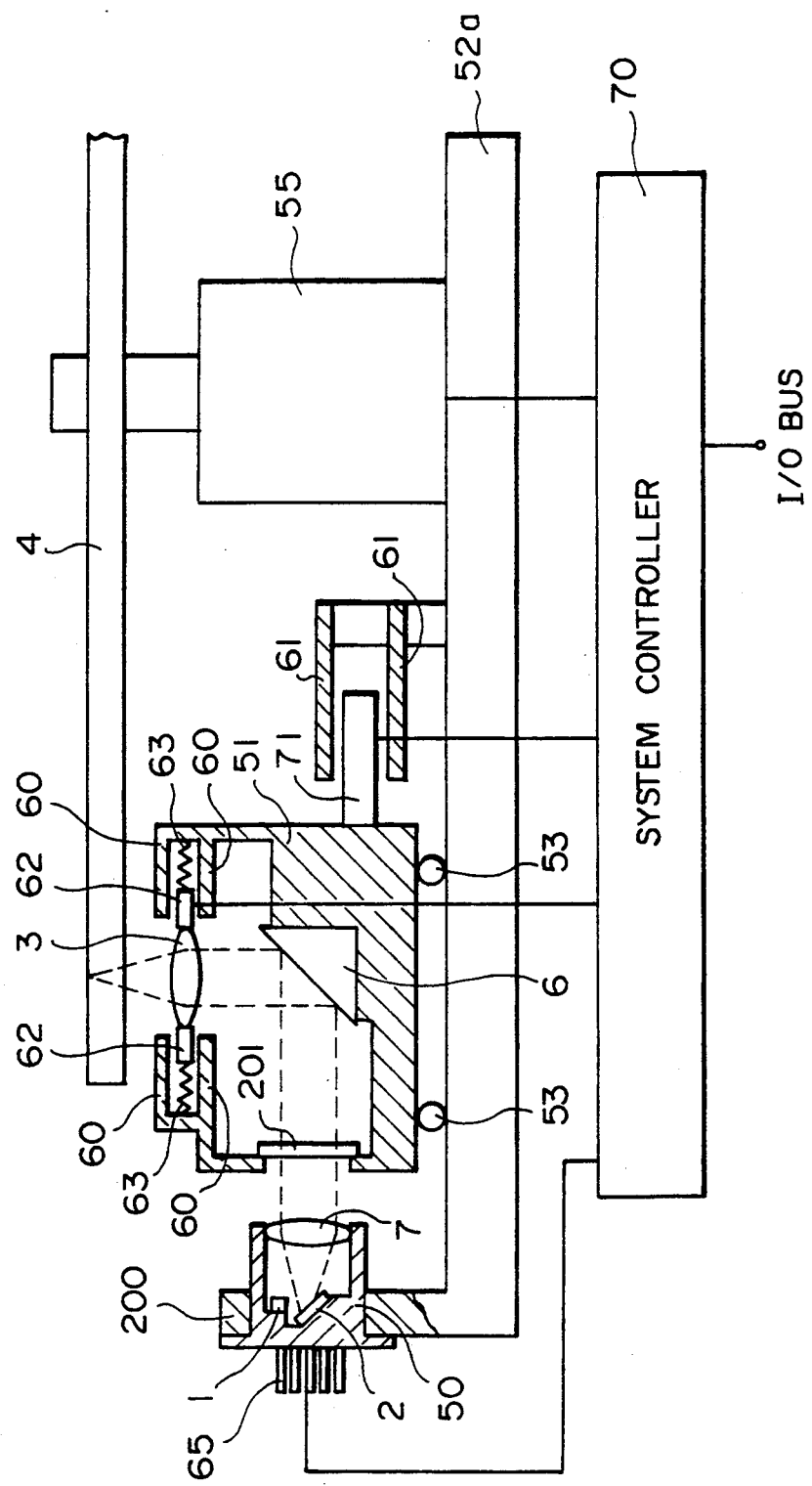
FIG. 18 is a front elevation showing, partially in section, of a further embodiment of the present invention.

Next, another embodiment of the present invention will be described with reference to FIG. 18. In FIG. 18, a light beam emitted from a semiconductor laser 1 fixed to a housing 50 and driven by a system controller 70 illuminates an integrated photo detector 2, the reflected light beam of which passes through a collimator lens 7 fixed to the housing 50 to be collimated. This light beam passes through a transmissible window 201 fixed to an outer housing 51, is reflected by a reflective mirror 6, and is converged by an objective lens to illuminate an optical disc 4. The light beam reflected by the optical disc 4 again passes through the objective lens 3 and the collimator lens 7 to illuminate the integrated photo detector 2. The structure of the integrated photo detector 2 is similar to that so far explained.

The housing 50 is mounted to a base 52a through a fitting portion 200. The objective lens 3 is supported by a suspension 63 so as to be movable in the direction perpendicular to a recording surface of the optical disc 4 and in the radial direction of the optical disc 4.

Signals are detected by the integrated photo detector 2 by the method so far explained and transferred to the system controller 70 through pins 65.

The system controller 70, in response to a detected focus error signal, applies a current to an electromagnetic coil 62 arranged in a magnetic circuit 60 to move the objective lens 3 in the direction perpendicular to the recording surface of the optical disc 4 for focus control.

In response to a detected track error signal and an information access request from an external apparatus through an I/O bus, the system controller 70 applies a current to a rough movement electromagnetic coil 71 arranged in a magnetic circuit 61 to move the outer housing 51 mounted on a straight rail mechanism 53 in the radial direction of the optical disc 4. The system controller 70 further applies a current to an electromagnetic coil 62 arranged in a magnetic circuit 60 to move the objective lens 3 in the radial direction of the optical disc 4. By thus moving the outer housing 51 and the objective lens 3, a track control is performed for the optical disc 4.

The system controller 70 rotates the optical disc 4 by means of a rotary motor 55. The system controller 70 also transfers read signals derived as described above to external apparatus through the I/O bus.

For performing the above operations, the system controller 70 is supplied with electric energy from an optional power supply, not shown in the drawing.

The structure as described above allows the outer housing 51 which is part of a movable portion for accessing to information to be separated from the housing 50, thus reducing the weight of the movable portion, that is, the weight of a portion driven by the electromagnetic coil 62, which leads to stabilizing the driving operation and improving the reliability against external disturbances.

In the embodiments from FIG. 1 to FIG. 18, the discussion has been focused on the information reading operation from an optical disc. Depending on the kind of optical discs, information can be written on an optical disc by modulating the intensity of an irradiated laser light beam. In this case, the system controller in each of the foregoing embodiments may receive information write request and read request from external apparatus through the I/O bus. The system controller moves an optical spot to a track on which information is to be written, modulates the intensity of an emitted laser light from the semiconductor laser in accordance with the information to be written, and performs the writing by changing the amount of a light beam to illuminate the optical disc. In this manner, the optical information processing apparatus can write information as well as read information with a high reliability.

Also, while the embodiments from FIG. 1 to FIG. 18 employ a semiconductor laser as a laser light source by way of example, another type of laser such as a gas laser, a solid-state laser or the like may be employed. Further, in the foregoing embodiments, the semiconductor laser may be removed from its location, and instead an optional type of laser may be arranged at a different position. In this case, a light beam emitted from a laser may be lead by an optical fiber or the like to the location at which the emitting point of the semiconductor laser was positioned, so as to be used as a laser light source. In such a structure, since the laser light source can be located outside the movable portion for performing the track control, the weight of the movable portion is reduced, so that the reliability of the apparatus is improved.

Further, while in the embodiments from FIG. 1 to FIG. 18, a semiconductor substrate is taken as an example of a substrate on which optical guides and so on are formed, this is because of the ease of the explanation on the photo detecting section. It is not necessary to particularly stick to a semiconductor substrate. Alternatively, a dielectric material such as glass or an insulating material may be used as a substrate, where a photo detecting section may be provided with photo detectors made of thin film semiconductor formed by utilizing a vapor deposition method or photo detectors which may be separately created and adhered on the photo detecting section.

As described above, according to the embodiments of the present invention, it is possible to simultaneously achieve an increase in incident angle tolerance and an increase in incident light beam positioning error tolerance, both associated with a photo detecting section in an optical information processing apparatus. The capability of providing a larger incident angle error tolerance means that the photo detecting section is also resistant to manufacturing errors, wavelength fluctuations and so on, thus making it possible to improve the total optical characteristics of the photo detecting section.

Such a photo detector, when used, results in improving the reliability of the optical information processing apparatus.

Also, the grating coupler split in a direction intersecting with the optical axis of a guided light beam and the use of a wavelength plate improve the light utilizing efficiency and accordingly the reliability of the optional information processing apparatus. If the light utilizing efficiency may be at a level similar to before, the intensity of an emitted laser beam can be lowered, thus resulting in reducing energy consumption.

A further effect produced by the present invention is that the relative position between the photo detector and the laser light source can be easily adjusted in a high accuracy. Consequently, a highly reliable optical information processing apparatus can be easily designed by using the photo detector of the present invention.

While it is not easy for an ordinary photo detector to separately detect signal light and stray light, the present invention can easily construct a structure which allows only target signal light to be selectively detected, thus providing a highly reliable optical information processing apparatus.

As described above, the present invention can simultaneously increase the incident angle tolerance and the incident light beam positioning error tolerance, both associated with a photo detecting section in an optical information processing apparatus, so that the apparatus can sufficiently attend to manufacturing errors, wavelength fluctuations and so on, thereby making it possible to improve the total optical characteristics of the photo detector as well as elevate the reliability of the optical information processing apparatus.

We claim:

1. An integrated optical information detector for converting light reflected from an optical information medium into an electric signal, comprising:
   a plurality of photo detecting sections, each section including an optical guide, a grating coupler for guiding reflected light into the optical guide, and a detector for detecting guided light in the optical guide, said photo detecting sections being adjacently formed on a substrate so as to extend along the direction of the optical axis of the guided light to thereby form a photo detecting strip;
   wherein a plurality of photo detecting strips are adjacently formed on the substrate in a direction transverse to the optical axis of the guided light; and
   wherein the photo detecting sections in each photo detecting strip extending along the direction of the optical axis of the guided light are electrically connected in common to a respective pad for synthesizing outputs from each of the photo detecting sections of each respective photo detecting strip.

2. An integrated optical information detector for converting light reflected from an optical information medium into an electric signal, comprising:
   a plurality of photo detecting sections, each section including an optical guide, a grating coupler for guiding reflected light into the optical guide, and a detector for detecting guided light in the optical guide, said plurality of photo detecting sections being spaced with a predetermined interval on a substrate along both a direction of an optical axis of the guided light and a direction transverse to the optical axis;
   wherein each of the photo detecting sections forming a respective row extending along the direction of the optical axis of the guided light being electrically connected in common to a respective pad for synthesizing outputs from each of the photo detecting sections in the row.

3. An integrated optical information detector for converting light reflected from an optical information medium into an electric signal, comprising:

a plurality of photo detecting sections, each section including an optical guide, a grating coupler for guiding reflected light into the optical guide, and a detector for detecting guided light in the optical guide, said photo detecting sections being adjacently formed on a substrate so as to extend along the direction of the optical axis of the guided light to thereby form a photo detecting strip;

wherein a plurality of photo detecting strips are integratedly formed on the substrate in a direction transverse to the optical axis of the guided light; and wherein the photo detecting sections in each photo detecting strip extending along the direction of the optical axis of the guided light are electrically connected in common to a respective pad for synthesizing outputs from each of the photo detecting sections of each respective photo detecting strip.

4. An integrated optical information detector for converting light reflected from an optical information medium into an electric signal, comprising:

a plurality of photo detecting sections, each section including an optical guide, a grating coupler for guiding reflected light into the optical guide, and a detector for detecting guided light in the optical guide, said plurality of photo detecting sections being integratedly formed with a predetermined interval on a substrate along both a direction of an optical axis of the guided light and a direction transverse to the optical axis;

wherein each of the photo detecting sections forming a respective row extending along the direction of the optical axis of the guided light being electrically connected in common to a respective pad for synthesizing outputs from each of the photo detecting sections in the row.

5. An integrated optical information detector for converting light from a light source onto an optical information medium via a lens, converting light reflected from the optical information medium into an electric signal using an integrated photo detector, and controlling a focal position of the lens using a signal obtained from the integrated photo detector, said integrated photo detector comprising:

a substrate; and a plurality of photo detector sections integratedly formed on the substrate, said photo detector sections each including an optical guide, a grating coupler for guiding reflected-light into the optical guide and a detector for detecting guided light in the optical guide, said plurality of photo detector sections being formed on the substrate in rows extending along the direction of the optical axis of the guided light and each of the photo detectors of each respective row of photo detector sections being electrically connected in common one to another;

said integrated photo detector being disposed in a housing incorporating said light source and said lens.

6. An integrated optical information detector for converting light from a light source onto an optical information medium via a lens, converting light reflected from the optical information medium into an electric signal using an integrated photo detector, and controlling a focal position of the lens using a signal obtained from the integrated photo detector, said integrated photo detector comprising:

a substrate; and a plurality of photo detector sections integratedly formed on the substrate, said photo detector sections each including an optical guide, a grating coupler for guiding reflected light into the optical guide and a detector for detecting guided light in the optical guide, said plurality of photo detector sections being formed on the substrate in rows extending along the direction of the optical axis of the guided light and each of the photo detectors of each respective row of photo detector sections being electrically connected in common one to another;

said integrated photo detector and said light source being disposed outside of a housing incorporating said lens and a reflection mirror.

7. An optical information control apparatus for converting a light reflected from an optical information medium into an electric signal, comprising:

a plurality of photo detecting sections, each section including an optical guide, a grating coupler for guiding reflected light into the optical guide, and a detector for detecting guided light in the optical guide, said plurality of photo detecting sections being spaced with a predetermined interval on a substrate along both a direction of an optical axis of the guided light and a direction transverse to the optical axis;

a plurality of synthesis means each being electrically connected to the photo detecting sections formed in each respective row extending along the direction of the optical axis of the guided light for synthesizing outputs from each of the photo detecting sections of a respective row to output a respective synthesized output from each row; and calculation means connected to said plurality of synthesis means to calculate synthesized outputs obtained from each of the synthesis means, whereby a read signal, focusing error signal and a tracking error signal are obtained to carry out focusing and tracking control.

* * * * *